US012803621B2

(12) United States Patent
Ren et al.

(10) Patent No.: US 12,803,621 B2
(45) Date of Patent: Nov. 17, 2026

(54) REFERENCE SIGNAL TRANSMISSION FOR RECONFIGURABLE INTELLIGENT SURFACE (RIS)-AIDED POSITIONING

(71) Applicant: QUALCOMM Incorporated, San Diego, CA (US)

(72) Inventors: Yuwei Ren, Beijing (CN); Weimin Duan, San Diego, CA (US); Huilin Xu, Temecula, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 495 days.

(21) Appl. No.: 18/549,395

(22) PCT Filed: May 26, 2021

(86) PCT No.: PCT/CN2021/096018
§ 371 (c)(1),
(2) Date: Sep. 7, 2023

(87) PCT Pub. No.: WO2022/246684
PCT Pub. Date: Dec. 1, 2022

(65) Prior Publication Data

US 2024/0162940 A1 May 16, 2024

(51) Int. Cl.
*H04B 7/04* (2017.01)
*H04L 25/02* (2006.01)

(52) U.S. Cl.
CPC ..... *H04B 7/04013* (2023.05); *H04L 25/0224* (2013.01)

(58) Field of Classification Search
None
See application file for complete search history.

(56) References Cited

U.S. PATENT DOCUMENTS

2015/0078379 A1* 3/2015 Wijnands ............ H04L 12/1886 370/390
2019/0037529 A1* 1/2019 Edge .......................... G01S 5/10
2020/0296680 A1* 9/2020 Akkarakaran ........ G01S 5/0273
(Continued)

FOREIGN PATENT DOCUMENTS

CN 111983560 A 11/2020
CN 112532547 A 3/2021

OTHER PUBLICATIONS

Supplementary European Search Report—EP219422664—Search Authority—Munich—Mar. 10, 2025.
(Continued)

*Primary Examiner* — Christopher T Wyllie
(74) *Attorney, Agent, or Firm* — Weaver Austin Villeneuve & Sampson LLP/QUALCOMM Incorporated

(57) ABSTRACT

Embodiments described herein provide for an RIS-aided determination of the location of mobile device that enables the signal reflected by the RIS to be identified through channel estimation. More specifically, an Orthogonal Cover Code (OCC)-based approach may be taken where the RIS is configured to use different weights to reflect different reference signals, enabling a receiving device to identify the reflected signal. This can be utilized on signals used for positioning of the mobile device. Additionally or alternatively, this can be used for positioning of the RIS.

28 Claims, 18 Drawing Sheets

(56) References Cited

U.S. PATENT DOCUMENTS

| | | | | |
|---|---|---|---|---|
| 2021/0144581 | A1 | 5/2021 | Tripathi et al. | |
| 2023/0176174 | A1* | 6/2023 | Penna | G01S 5/0036 342/451 |
| 2024/0162940 | A1* | 5/2024 | Ren | H04L 25/0204 |

OTHER PUBLICATIONS

Wymeersch H., et al., "Radio Localization and Mapping with Reconfigurable Intelligent Surfaces", arXiv:1912.09401v1 [eess. SP], Dec 19, 2019, Cornell University Library, 201 Olin Library Cornell University Ithaca, NY 14853, Dec 19, 2019, pp. 1-7, XP081569725, the whole document.

Zheng B., et al., "Intelligent Reflecting Surface-Enhanced OFDM: Channel Estimation and Reflection Optimization", arXiv:1909. 03272v3 [cs.IT], Jan. 29, 2020, vol. 9, No. 4, Apr. 2020, Cornell University Library, 201 Olin Library Cornell University Ithaca, NY 14853, Sep. 7, 2019, pp. 1-5, XP081587633, Figure 1, pp. 2-3, Section II, pp. 3-4, Section III-A.

International Search Report and Written Opinion—PCT/CN2021/096018—ISA/EPO—Feb. 17, 2022.

Yang Y., et al., "Intelligent Reflecting Surface Meets OFDM: Protocol Design and Rate Maximization", IEEE Transactions on Communications, Jul. 2020, vol. 68, No. 7, IEEE, pp. 4522-4535.

Zheng B., et al., "Intelligent Reflecting Surface-Enhanced OFDM: Channel Estimation and Reflection Optimization", IEEE Wireless Communications Letters, Apr. 2020, vol. 9, No. 4, IEEE, pp. 518-522.

* cited by examiner

REFERENCE SIGNAL TRANSMISSION FOR RECONFIGURABLE INTELLIGENT SURFACE (RIS)-AIDED POSITIONING

RELATED APPLICATIONS

This application is a National Phase entry of International Application No. PCT/CN2021/096018, filed May 26, 2021, entitled "REFERENCE SIGNAL TRANSMISSION FOR RECONFIGURABLE INTELLIGENT SURFACE (RIS)-AIDED POSITIONING" which is assigned to the assignee hereof, and incorporated herein in its entirety by reference.

BACKGROUND

1. Field of Disclosure

The present disclosure relates generally to the field of wireless communications, and more specifically to determining the location or position of a mobile device using radio frequency (RF) signals.

2. Description of Related Art

In a wireless communication network, RF sensing techniques can be used to determine the position of an mobile device. Some of these positioning techniques may involve determining distance and/or angular information of RF signals transmitted by one or more transmitting devices and received by one or more receiving devices, where the mobile device may comprise a transmitting device or a receiving device, depending on the positioning technique used. Further, a Reconfigurable Intelligent Surface (RIS) can be used in some positioning techniques in which the RIS reflects a signal transmitted by a transmitting device. These techniques are generally referred to herein as "RIS-aided" positioning techniques. However, it can be difficult to distinguish a signal reflected from an RIS from multipath or other signals.

BRIEF SUMMARY

Embodiments described herein provide for an RIS-aided determination of the location of mobile device that enables the signal reflected by the RIS to be identified through channel estimation. More specifically, an Orthogonal Cover Code (OCC)-based approach may be taken where the RIS is configured to use different weights to reflect different reference signals, enabling a receiving device to identify the reflected signal. This can be utilized on signals used for positioning of the mobile device. Additionally or alternatively, this can be used for positioning of the RIS.

An example method of channel estimation for positioning using an Reconfigurable Intelligent Surface (RIS), according to this disclosure, comprises obtaining first and second measurement information made by a receiving device of a respective first plurality of received wireless signals and second plurality of received wireless signals, wherein each of the first plurality of received wireless signals and second plurality of received wireless signals comprises a respective RIS-reflected signal that travels a first path from a transmitting device to the receiving device by reflecting off the RIS, and at least one other wireless signal that travels a second path. The RIS implements a first weight to reflect the RIS-reflected signal of the first plurality of received wireless signals, and the RIS implements a second weight to reflect the RIS-reflected signal of the second plurality of received wireless signals. The method also comprises determining a wireless channel corresponding to each of the first path and the second path based at least in part on the first and second measurement information, the first weight, and the second weight.

An example network-connected device for channel estimation for positioning using an Reconfigurable Intelligent Surface (RIS), according to this disclosure, comprises a transceiver, a memory, one or more processors communicatively coupled with the transceiver and the memory, wherein the one or more processors are configured to obtain first and second measurement information made by a receiving device of a respective first plurality of received wireless signals and second plurality of received wireless signals, wherein each of the first plurality of received wireless signals and second plurality of received wireless signals comprises: a respective RIS-reflected signal that travels a first path from a transmitting device to the receiving device by reflecting off the RIS, and at least one other wireless signal that travels a second path, and the RIS implements a first weight to reflect the RIS-reflected signal of the first plurality of received wireless signals, and the RIS implements a second weight to reflect the RIS-reflected signal of the second plurality of received wireless signals. The one or more processing units are further configured to determine a wireless channel corresponding to each of the first path and the second path based at least in part on the first and second measurement information, the first weight, and the second weight.

An example apparatus for channel estimation for positioning using an Reconfigurable Intelligent Surface (RIS), according to this disclosure, comprises means for obtaining first and second measurement information made by a receiving device of a respective first plurality of received wireless signals and second plurality of received wireless signals, wherein each of the first plurality of received wireless signals and second plurality of received wireless signals comprises: a respective RIS-reflected signal that travels a first path from a transmitting device to the receiving device by reflecting off the RIS, and at least one other wireless signal that travels a second path, and the RIS implements a first weight to reflect the RIS-reflected signal of the first plurality of received wireless signals, and the RIS implements a second weight to reflect the RIS-reflected signal of the second plurality of received wireless signals. The apparatus further comprises means for determining a wireless channel corresponding to each of the first path and the second path based at least in part on the first and second measurement information, the first weight, and the second weight.

According to this disclosure, an example non-transitory computer-readable medium stores instructions for channel estimation for positioning using an Reconfigurable Intelligent Surface (RIS), the instructions comprising code for obtaining first and second measurement information made by a receiving device of a respective first plurality of received wireless signals and second plurality of received wireless signals, wherein each of the first plurality of received wireless signals and second plurality of received wireless signals comprises a respective RIS-reflected signal that travels a first path from a transmitting device to the receiving device by reflecting off the RIS, and at least one other wireless signal that travels a second path, and wherein: the RIS implements a first weight to reflect the RIS-reflected signal of the first plurality of received wireless signals, and the RIS implements a second weight to reflect the RIS-reflected signal of the second plurality of received wireless signals. The instructions further comprise code for determining a wireless channel corresponding to each of the first path and the second path based at least in part on the first and second measurement information, the first weight, and the second weight.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
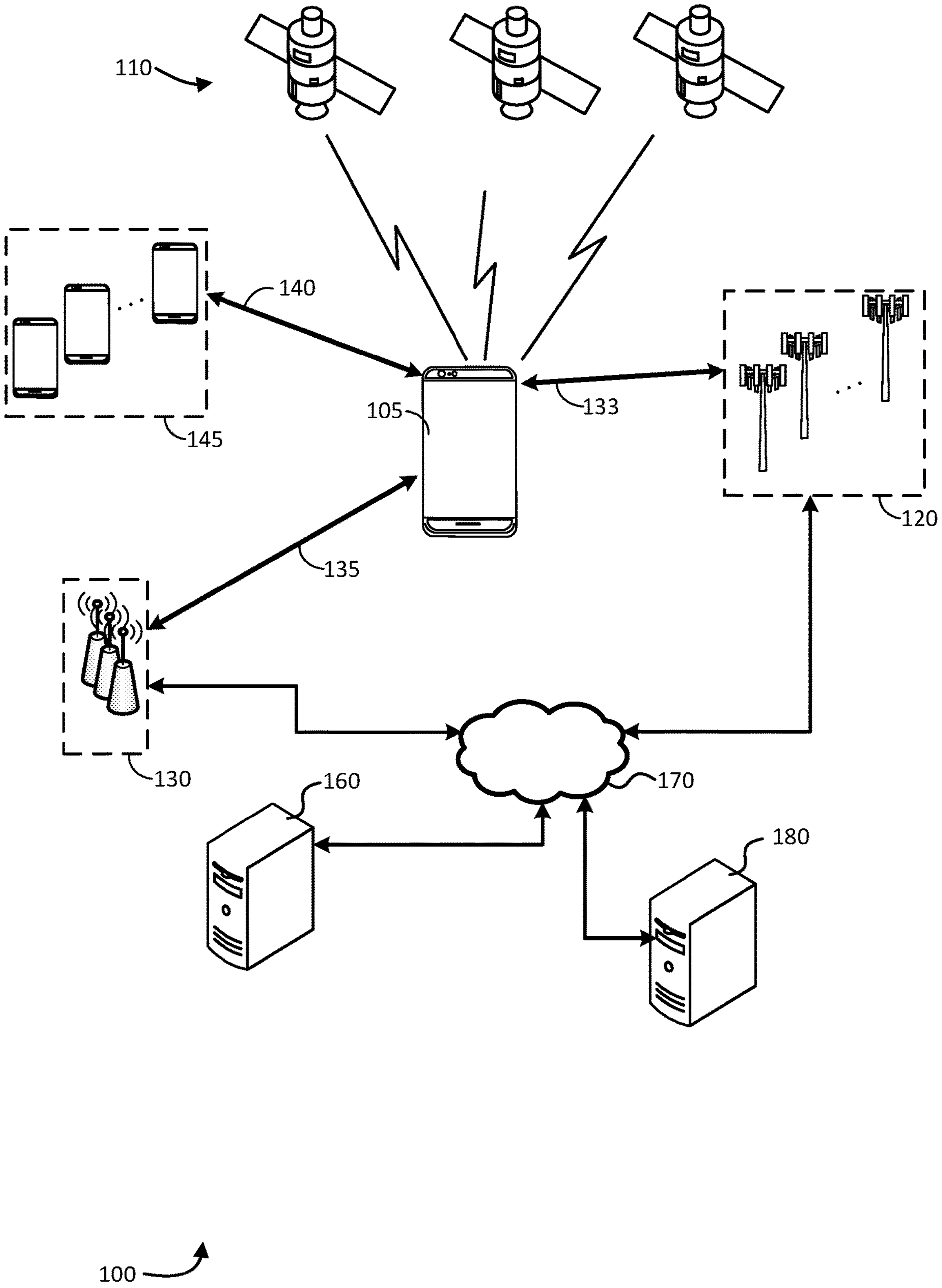
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

Additionally, references to "reference signals," "positioning reference signals," "reference signals for positioning," and the like may be used to refer to signals used for positioning of a user equipment (UE). As described in more detail herein, such signals may comprise any of a variety of signal types but may not necessarily be limited to a Positioning Reference Signal (PRS) as defined in relevant wireless standards.

As noted, embodiments described herein provide for an RIS-aided determination of the location of a mobile device (also referred to herein as a "target" device) that enables a receiving device to identify a signal reflected by the RIS, enabling the RIS to be used as an anchor point (e.g., device with a known location) for the determination of the mobile device. More specifically, an Orthogonal Cover Code (OCC)-based approach may be taken where the RIS is configured to use different weights to reflect different reference signals for positioning, enabling a receiving device to perform channel estimation to identify the reflected signal. The target device may act as the transmitting device or the receiving device, depending on the positioning technique used. Moreover, embodiments may also perform various functions to determine the location of an RIS to be able to use the RIS as an anchor point in this manner. Additional details will follow, after an initial description of relevant systems and technologies."]

FIG. 1 is a simplified illustration of a positioning system 100 in which a UE 105, location server 160, and/or other components of the positioning system 100 can use the techniques provided herein for performing channel estimation and/or RIS-aided positioning in the manner described herein, according to an embodiment. The techniques described herein may be implemented by one or more components of the positioning system 100. The positioning system 100 can include: a UE 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 are communicatively coupled to the network 170. In some embodiments, the base station 120*s* may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP, for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with network-connected and Internet-connected devices, including location server 160, using a second communication link 135.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other UEs 145, which may be mobile or fixed. When or more other UEs 145 are used in the position determination of a particular UE 105, the UE 105 for which the position is to be determined may be referred to as the "target UE," and each of the one or more other UEs 145 used may be referred to as an "anchor UE." For position determination of a target UE, the respective positions of the one or more anchor UEs may be known and/or jointly determined with the target UE. Direct communication between the one or more other UEs 145 and UE 105 may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location or some other location such as a location for UE 105 at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, or child or pet location). Additionally or alternatively, the external client 180 may obtain and provide the location of UE 105 to an emergency services provider, government agency, etc.

Figure 2:
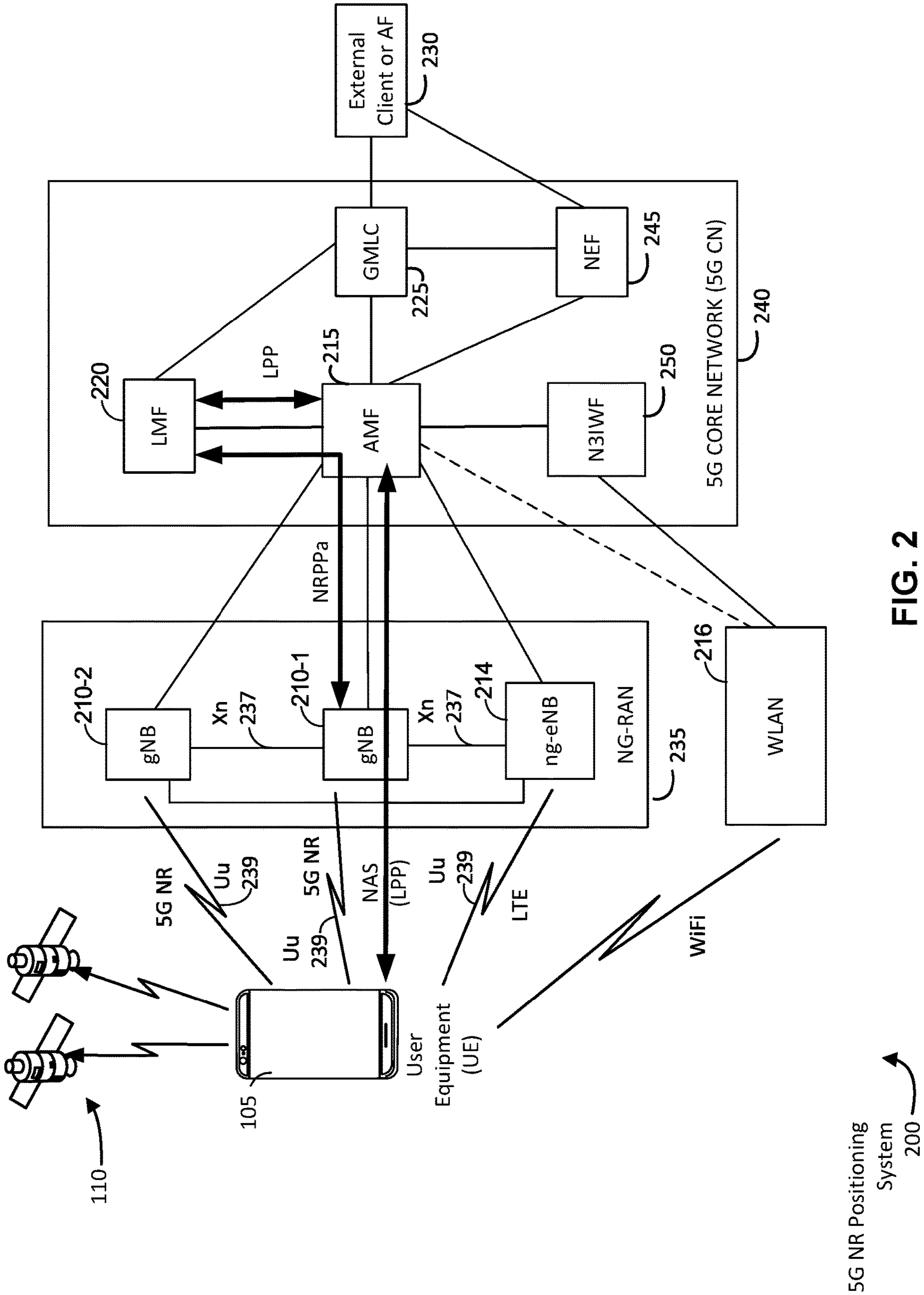
FIG. 2 is a diagram of a 5th Generation (5G) New Radio (NR) positioning system, illustrating an embodiment of a positioning system (e.g., the positioning system of FIG. 1) implemented within a 5G NR communication system.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes 210, 214, 216 (which may correspond with base stations 120 and access points 130 of FIG. 1) and (optionally) an LMF 220 (which may correspond with location server 160) to implement one or more positioning methods. Here, the 5G NR positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. The 5G NR positioning system 200 may further utilize information from GNSS satellites

110 from a GNSS system like Global Positioning System (GPS) or similar system (e.g. GLONASS, Galileo, Beidou, Indian Regional Navigational Satellite System (IRNSS)). Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), navigation device, Internet of Things (IoT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include NR NodeB (gNB) 210-1 and 210-2 (collectively and generically referred to herein as gNBs 210). Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between the UE 105 and one or more of the gNBs 210, which may provide wireless communications access to the 5G CN 240 on behalf of the UE 105 using 5G NR. The wireless interface between base stations (gNBs 210 and/or ng-eNB 214) and the UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. It is noted that while only one ng-eNB 214 is shown in FIG. 2, some embodiments may include multiple ng-eNBs 214. Base stations 210, 214 may communicate directly with one another via an Xn communication interface. Additionally or alternatively, base stations 210, 214 may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes 210, 214, and 216 configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node 210, 214, or 216 of a first RAT to an access node 210, 214, or 216 of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematic (RTK), Precise Point Positioning (PPP), Differential GNSS (DGNSS), Enhance Cell ID (ECID), angle of arrival (AOA), angle of departure (AOD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.445. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, TDOA, multi-cell RTT, AOD, and/or ECID. The NRPPa protocol may be used to support positioning of UE 105 using network based position methods such as ECID, AOA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

In a 5G NR positioning system 200, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client or AF 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AOA, Receive Time-Transmission Time Difference (Rx-Tx), Differential AOA (DAOA), AOD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AOA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105. Sidelink (SL)-assisted positioning comprises signals communicated between the UE 105 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by TRPs/base stations or SL-PRS transmitted by other UEs), which can be used for TDOA, AOD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AOD and/or AOA.

Figure 3:
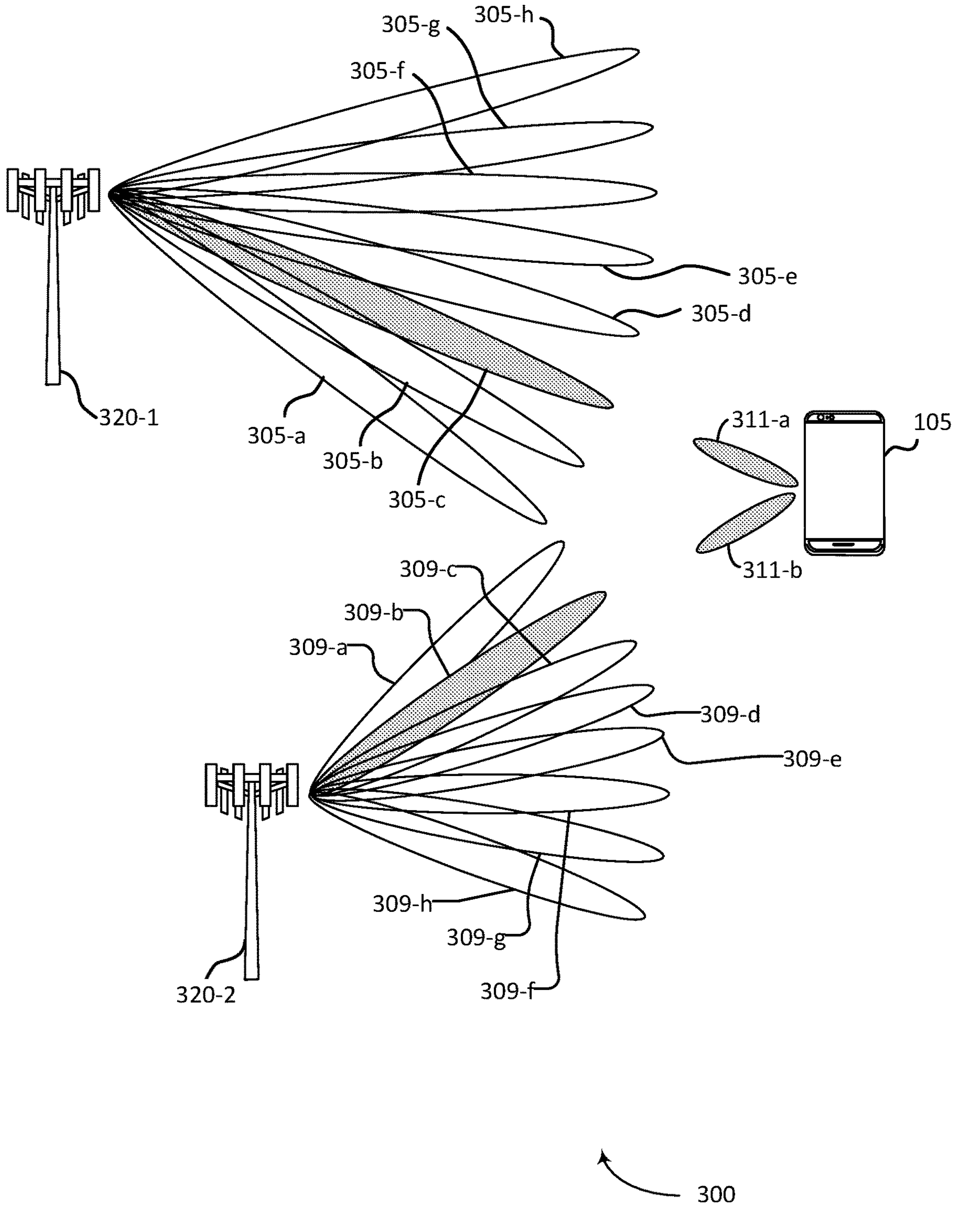
FIG. 3 is a diagram illustrating beamforming in a 5G NR positioning system.

FIG. 3 is a diagram illustrating a simplified environment 300 including two TRPs 320-1 and 320-2 (which may correspond to base stations 120 of FIG. 1 and/or gNBs 210 and/or ng-eNB 214 of FIG. 2) producing directional beams for transmitting RF reference signals, and a UE 105. Each of the directional beams is rotated, e.g., through 320 or 360 degrees, for each beam sweep, which may be periodically repeated. Each direction beam can include an RF reference signal (e.g., a PRS resource), where TRP 320-1 produces a set of RF reference signals that includes Tx beams 305-*a*, 305-*b*, 305-*c*, 305-*d*, 305-*e*, 305-*f*, 305-*g*, and 305-*h*, and the TRP 320-2 produces a set of RF reference signals that includes Tx beams 309-*a*, 309-*b*, 309-*c*, 309-*d*, 309-*e*, 309-*f*, 309-*g*, and 309-*h*. Because UE 105 may also include an antenna array, it can receive RF reference signals transmitted by TRPs 320-1 and 320-2 using beamforming to form respective receive beams (Rx beams) 311-*a* and 311-*b*. Beamforming in this manner (by TRPs 320 and optionally by UEs 105) can be used to make communications more efficient. It can also be used for other purposes, such as transmitting reference signals for RF sensing of an object. (An object detected using the radar techniques described herein is also referred to herein as a "target.")

Tx beams 305 and 309 can be particularly useful for facilitating efficient communications between a TRP 320 and UE 105. And as noted, Tx beams can be used to make angular measurements (e.g., AoD measurements) for the positioning of the UE 105. Tx beams 305 and 309 further may be used to perform RIS-aided positioning of the UE 105, in which beams can be used to direct signals not only toward the UE 105 but also toward an RIS (not shown), which can reflect signals toward the UE 105. Based on the one or more echo signals, or reflections) detected by the UE 105, information regarding the location of the UE 105 may be determined. More generally, this process can be used to perform positioning of a UE 105, which may be aided by an RIS. Further, such RF positioning can be conducted with or without the use of Tx beams 305 and 309. Additional details are described herein regarding RIS-aided positioning, with respect to FIG. 4.

Figure 4:
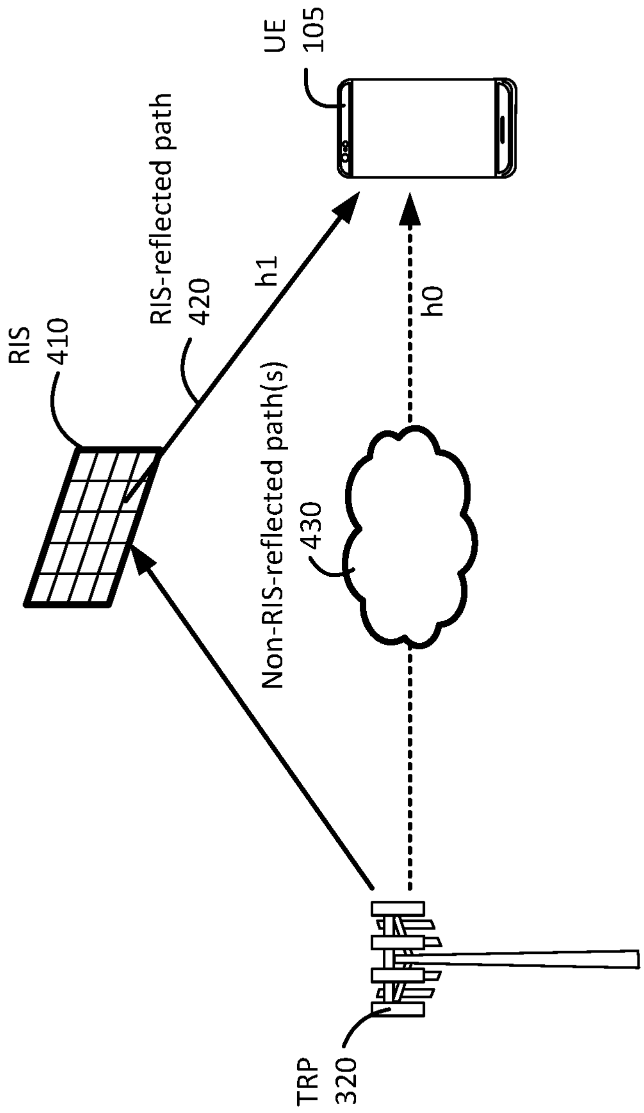
FIG. 4 is a simplified diagram illustrating a configuration in which positioning of a User Equipment (UE) and/or channel estimation may be performed using a Reconfigurable Intelligent Surface (RIS), according to an embodiment.

FIG. 4 is a simplified diagram illustrating a configuration in which positioning of a UE 105 and/or channel estimation can be performed using a TRP 320 and RIS 410, according to an embodiment. Here, positioning is performed based on DL reference signals (e.g., DL-PRS) transmitted by the TRP 320 and received by the UE 105. In other words, the TRP 320 acts as a transmitting device, and the UE 105 acts as a receiving device. However, as described hereafter with regard to FIGS. 9A and 9B, some embodiments may involve positioning in which the UE 105 acts as a transmitting device and the TRP 320 acts as a receiving device, where the UE transmits UL reference signals (e.g., UL-PRS, SRS, etc.) that are received by the TRP 320.

RISs (which also may be referred to as a software-controlled metasurfaces, intelligent reflecting surfaces, or reconfigurable reflect arrays/metasurfaces) are garnering recent attention in wireless communication applications as a means to enable propagation paths for RF signals around blockage. Although the RIS 410 may be a passive device, it may comprise an array and may therefore redirect RF signals using beamforming (e.g., in a manner similar to the beamforming described above with regard to FIG. 3). As such, the RIS 410 can enable wireless coverage of the TRP 320 (or, more broadly, the wireless network of the TRP 320) to extend to otherwise unreachable areas. The RIS 410 can do this using a software-controlled reflection/scattering profile to redirect wireless signals toward the UE 105 in real time. Additionally or alternatively, an RIS 410 may act as a repeater by receiving signals transmitted by a TRP 320 and directing them toward a UE 105. (As used herein, "directing," "redirecting," "reflecting," and similar terms used when referring to the functionality of the RIS 410 may refer to the reflecting and/or repeating functionality of an RIS.) The functionality of the RIS 410 can be controlled by the TRP 320 or a location server (not shown) using a control channel. This adds controllable paths to the channel between the TRP 320 and UE 105, which is useful in environments with severe blockage 415 and/or (as utilized in embodiments herein) positioning of UE 105 and/or other mobile devices. Because RIS 410 may have much higher array gain than the UE 105 it may therefore enhance the RF signal sensitivity of the UE 105 by redirecting signals toward the UE 105.

RIS-aided positioning of the UE 105 can generally proceed in the manner previously described with regard to positioning the UE 105, where various measurements (e.g., AoD, TDOA, etc.) can be made to determine the position of the UE 105. Here, however, the RIS 410 can mimic another transmitting device (e.g., TRP or anchor UE) by producing an additional controlled signal for reception by the UE 105. But rather than generating the signal the RIS 410 reflects a signal transmitted by the TRP 320.

Because the RIS 410 reflects signals, there may be at least two paths from the TRP 320 to the UE 105 (or, more generally, from a transmitting device to a receiving device). These two paths include an RIS-reflected path 420 and a non-RIS-reflected path(s) 430. The non-RIS-reflected path(s) 430 may comprise a direct path and/or a path that includes one or more reflections. As noted, from the perspective of the UE 105 that receives signals along the RIS-reflected path 420 and the non-RIS-reflected path(s) 430, signals can be used as if they are from different sources. For example, TDOA measurements can be made between signals received via the reflected path and a signal received from a direct path (e.g. non-RIS-reflected path(s) 430). These measurements can be used, for example, in addition with other information (e.g., angle information, measurements using other transmitting devices/RISs, etc.) to determine the position of the UE 105 geometrically.

Although the RIS 410 adds functionality that enables positioning of the UE 105, RIS-aided positioning is not without its challenges. In many instances, for example, it may be difficult for a receiving device to differentiate RIS-reflected signals from other signals. In the example of FIG. 4, for instance, it may be difficult for the UE 105 to estimate a channel, h0, corresponding to non-RIS-reflected path(s) 430 and a channel, h1, corresponding to RIS-reflected path 420.

Some techniques for channel estimation may include comparing signals received at the UE 105 when the RIS 410 is both on and off. For example, at time t1, the RIS 410 is turned on and the TRP 320 transmits a first reference signal that travels along both RIS-reflected path 420 and non-RIS-reflected path(s) 430 and is received by UE 105. The estimated channel, therefore, is h0+h1. At time t2, the RIS 410 is turned off and the TRP 320 transmits a second reference signal that travels along non-RIS-reflected path(s) 430 and is received by UE 105. The estimated channel is then h0. The UE 105 can then differentiate these estimated channels (h0+h1 and h0) to determine the channel, h1, corresponding to the RIS-reflected path 420.

This on/off techniques for distinguishing a signal received via the RIS-reflected path 420 using channel estimation has some shortcomings. Powering the RIS 410 on and off may not easily be done in a way that allows dynamic control in the time domain, which can interfere with service the RIS 410 provides to other UEs. In other words, the time it takes to power on/off the RIS 410 may impact wireless service provided to other UEs that is enabled via the RIS 410. Additionally, there may be a component of a reference signal transmitted by the TRP 320 that is reflected by the RIS 410 even one powered down. This may therefore interfere with a estimation of the channel, h0, corresponding to the non-RIS-reflected path(s) 430.

Figure 5:
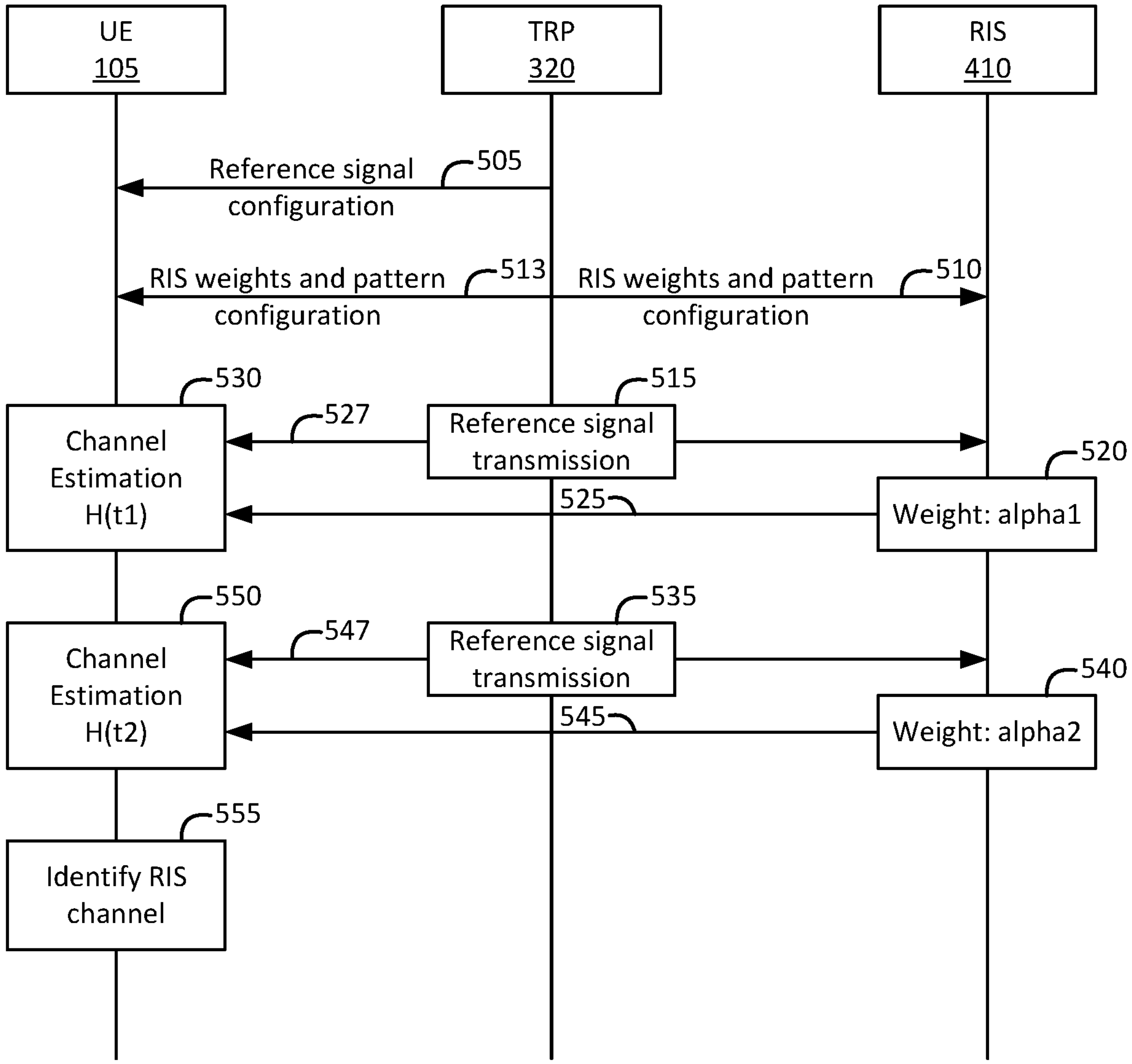
FIG. 5 is a call-flow diagram illustrates a process by which a receiving device can identify an RIS channel, according to an embodiment.
Figure 6:
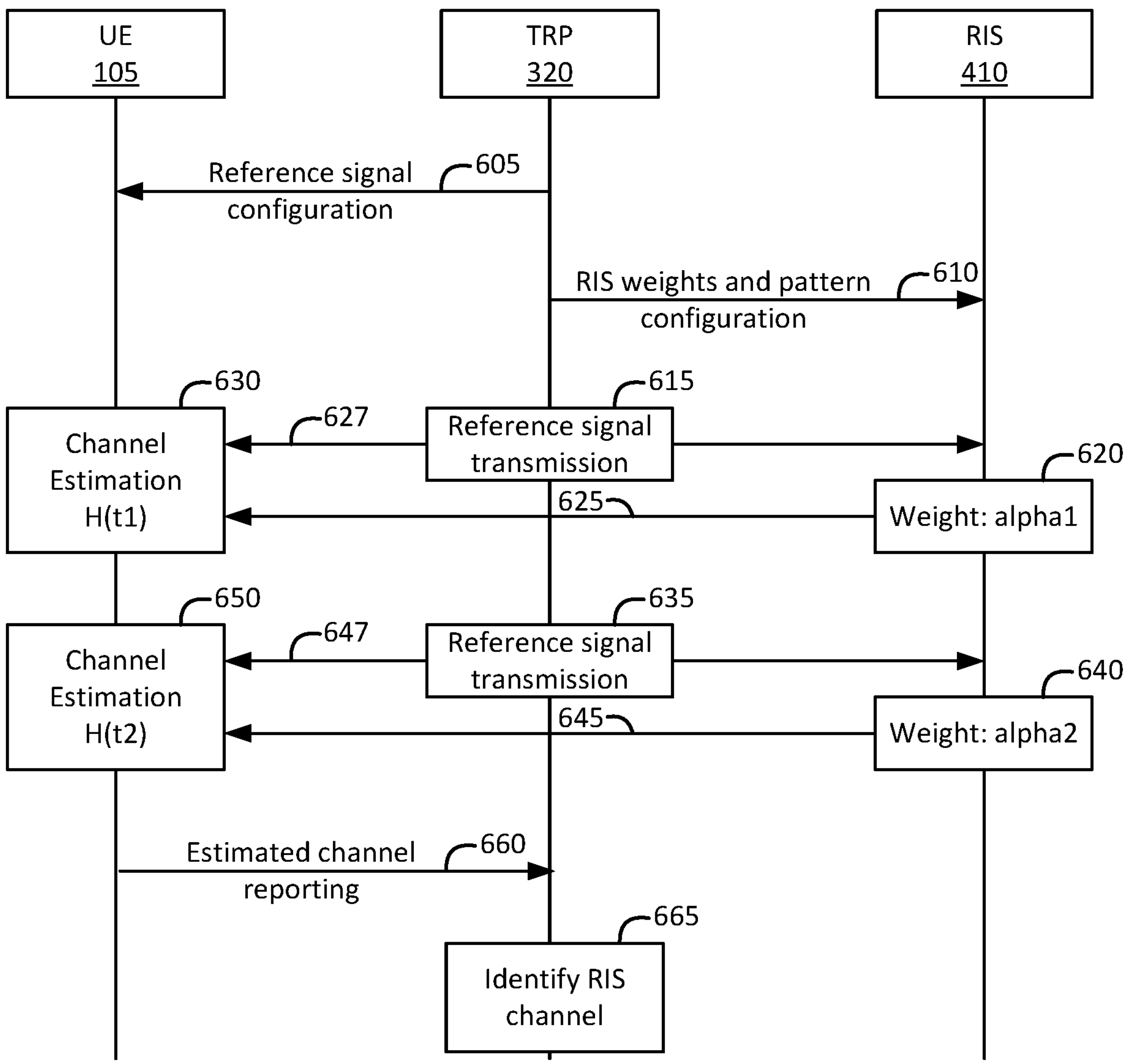
FIG. 6 is a call-flow diagram illustrates a process by which a transmitting device can identify an RIS channel, according to an embodiment.

According to embodiments herein, the components of reference signals transmitted by a transmitting device (e.g., TRP 320 of FIG. 4) that are reflected by the RIS 410 can be identified by a receiving device (e.g., UE 105) by adjusting the weights with which the RIS reflects the reference signals, where different weights correspond with different phases (and, optionally, different magnitudes). Put more broadly, the transmission of reference signals by transmitting device and the reflection of those reference signals by the RIS 410 using different weights can allow the RIS channel to be identified by estimating the channel for the reference signals. According to some embodiments, this identification can be performed by the TRP 320 or by the UE 105, depending on desired functionality. FIGS. 5 and 6 provide examples of how this can be done.

FIG. 5 is a call-flow diagram illustrates a process by which a receiving device can identify an RIS channel, according to an embodiment. The example in FIG. 5 reflects the configuration of FIG. 4 in which the transmitting device comprises a TRP 320 and the receiving device comprises a UE 105. As such, the process in FIG. 5 may be used for UE-based positioning in which the UE determines its position. Alternative embodiments may alter the order of certain operations, use different transmitting and/or receiving devices, etc. An example in which the transmitting device comprises a UE 105 and the receiving device comprises a TRP 320 is provided hereafter with regard to FIGS. 9A and 9B.

The process may begin as indicated at arrow 505, where the TRP 320 provides a reference signal configuration to the UE 105. According to some embodiments, the reference signal configuration at arrow 505 may comprise information provided from the network to the UE 105 regarding the reference signals to be transmitted (e.g., at blocks 515 and 535) for which channel estimation and RIS channel determination can be made. As such, the configuration may comprise information regarding the timing and/or frequency of the reference signals, enabling the UE 105 to measure the reference signals. In embodiments in which the reference signals comprise PRS resource, the reference signal configuration may comprise a PRS configuration.

At arrows 510 and 513 the TRP provides RIS weights and pattern configuration to the RIS 410 and UE 105, respectively. The RIS weights and pattern configuration may comprise the weights used for each reference signal corresponding to the reference signal configuration provided at arrow 505. The pattern configuration may comprise a pattern by which weights are applied (e.g., toggling between two different weights, cycling between three or more weights, etc.). The RIS 410 can use this configuration when applying different weights to reflect different reference signal transmissions. The UE 105 can use this configuration when performing channel estimation to determine which weights were used by the RIS 410.

At block 515, the TRP 320 transmits a first reference signal. The RIS 410 reflects the signal using a first weight, alpha1 (as indicated at block 520), in accordance with the configuration received at arrow 510. The reflection (represented by arrow 525) is then received by the UE 105 via the RIS-reflected path 420. As represented by arrow 527, the UE 105 also receives the first reference signal via the non-RIS-reflected path(s) 430.

At block 530, the UE 105 performs channel estimation based on the first reference signal. The channel for the first reference signal received by the UE 105 at time t1 can be represented as:

$$H(t1)=h0+\text{alpha1}*h1, \tag{1}$$

where, as indicated in FIG. 4, h1 represents the channel of the RIS-reflected path 420 and h0 represents the channel of the non-RIS-reflected path(s) 430. Put differently, the terms h0 and h1 can be seen as transfer functions of the reference signals, where each of these terms may be treated as a different path or set of paths.

The operations at items 515-530 can then be repeated for a second reference signal. Specifically, as indicated at block 515, the TRP 320 transmits a second reference signal. The RIS 410 reflects the signal using a second weight, alpha2 (as indicated at block 540), in accordance with the configuration received at arrow 510. The reflection, represented by arrow 545, is then received by the UE 105 via the RIS-reflected path 420. Again, as represented by arrow 547, the UE 105 also receives the second reference signal via the non-RIS-reflected path(s) 430.

At block 550, the UE 105 performs channel estimation based on the second reference signal. The channel for the second reference signal received by the UE 105 at time t2 can be represented as:

$$H(t2)=h0+\text{alpha2}*h1. \tag{2}$$

According to some embodiments, the TRP 320 can be configured to transmit the first reference signal (at block 515) and the second reference signal (at block 535) within a threshold time difference. This threshold time difference can be based on channel coherence time, such that any variation in h0 and h1 between the transmissions of the first reference signal and second reference signal is negligible.

Using the channel estimation performed at blocks 530 and 550, the UE 105 can then identify the RIS channel, h1, as indicated at block 555. This can be done by taking the difference between H(t1) and H(t2) as follows:

$$h1=\frac{H(t1)-H(t2)}{alpha1-alpha2}. \tag{3}$$

The other channel, h0, may be determined by:

$$h0=\frac{alpha2*H(t1)-alpha1*H(t2)}{alpha2-alpha1}. \tag{4}$$

By using channels h0 and h1, the reference signal reflected by the RIS via the RIS-reflected path 420 can be distinguished from the reference signal received via non-RIS-reflected path(s) 430. And thus, these signals can be used to determine the location of the UE 105 using RIS-aided positioning techniques, as previously noted. (Additionally or alternatively, a similar process for channel estimation may be used for determining the position of the RIS, as described hereafter.)

FIG. 6 is a call-flow diagram illustrates a process by which a transmitting device can identify an RIS channel, according to an embodiment. Similar to FIG. 5, the example in FIG. 6 reflects the configuration of FIG. 4 in which the transmitting device comprises a TRP 320 and the receiving device comprises a UE 105. As such, the process in FIG. 6 may be used for UE-assisted positioning in which the UE 105 provides measurement information (e.g., including channel estimation information) to a network entity such as the TRP 320 or location server 160 (not shown in FIG. 6), enabling the network entity to determine the position of the UE 105.

The operations 605-650 in FIG. 6 generally echo corresponding operations of FIG. 5, previously described. In FIG. 6, however, the TRP may not provide the UE 105 with RIS weights and pattern configuration as it did in the process of FIG. 5 because the UE does not need this information to identify the RIS channel. Instead, as shown by arrow 660, the UE 105 provides estimated channel information to the TRP 320. This can include, for example, the values of H(t1) and H(t2) as estimated at blocks 630 and 650. According to some embodiments, this reporting by the UE 105 may be based on channel reporting. The TRP 320 can then use this information, along with the weights alpha1 and alpha2 to identify RIS channel h1 (e.g., using equation (3)), as indicated at block 665.

According to some embodiments, the weights alpha1 and alpha2 may be orthogonal, in which case the processes in FIGS. 5 and 6 may be an implementation of Orthogonal Cover Code (OCC). For example, where weights alpha1 and alpha2 are respectively +1 and −1, the corresponding values of H(t1) and H(t2) would be h0+h1 and h0−h1.

Figure 7:
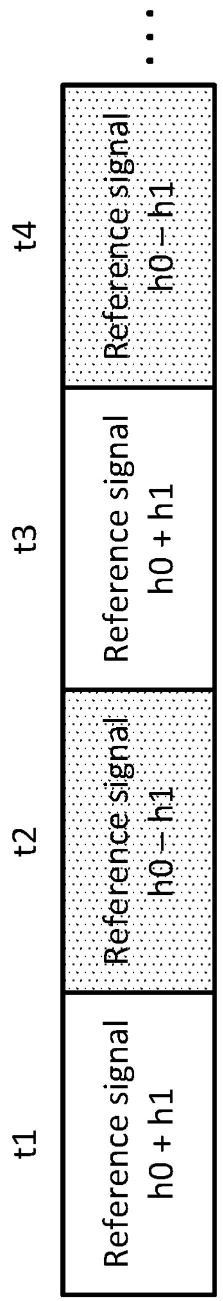
FIG. 7 is a diagram illustrating an example Orthogonal Cover Code (OCC) pattern that can be used in a sequence of reference signals, according to an embodiment.

As previously indicated, weights may be applied to different reference signals to form a pattern (e.g., an OCC pattern) across time. Moreover, according to some embodiments, more than two reference signals can be used to help ensure accurate channel estimation. FIG. 7, for example, is a graph illustrating an OCC pattern implemented across four reference signals corresponding times t1 to t4. In this example, weights toggle between values +1 and −1 such that corresponding values of H(t1) and H(t2) toggle between h0+h1 and h0−h1. The transmission of the reference signal and the configuration of the RIS to implement this OCC pattern can be coordinated by a location server 160 and/or TRP 320.

According to some embodiments, the network can provide information regarding the weights to the RIS 410 and/or UE 105 (e.g., RIS weights and pattern configuration at arrow 513 of FIG. 5) using Radio Resource Control (RRC) signaling. In addition to information regarding weights, this information may include, for example, an ID of the RIS 410 (e.g., RIS ID), a time stamp for the corresponding reference signal, a frequency stamp for the corresponding reference signal, etc. Furthermore, for repeating patterns (as shown in FIG. 7), information regarding the pattern and/or periodicity can be conveyed. This pattern information and weight indication may be based on Media Access Control (MAC) Control Element (MAC CE) or Downlink Control Information (DCI). According to some embodiments, the network may provide weight and pattern information to the UE 105 and a reference signal configuration. For example, the information conveyed at arrows 505 and 513 in FIG. 5 may be combined in a single transmission from the TRP 320 to the UE 105.

Figure 8A:
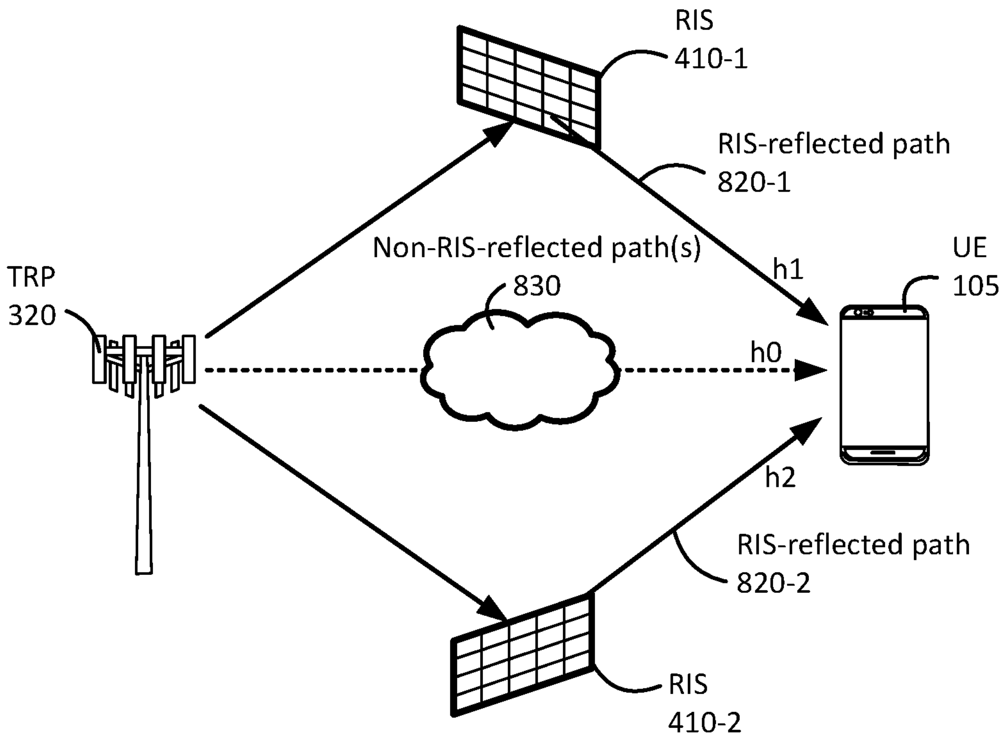
FIG. 8A is a simplified diagram illustrating how positioning of a UE 105 can be performed using a Transmission Reception Point (TRP) and two RISs, according to an embodiment.
Figure 8B:
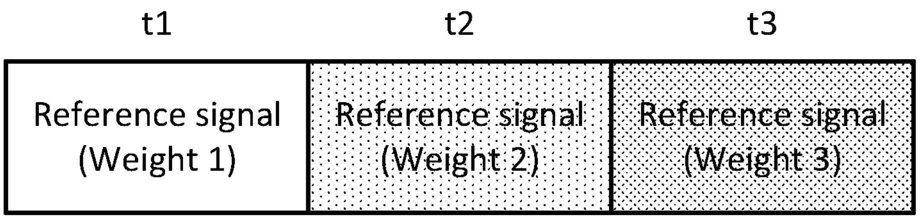
FIG. 8B is a diagram illustrating an example pattern of weights that can be used in a sequence of reference signals in the configuration of FIG. 8A, according to an embodiment.

The previously-described techniques can be extended to multiple RISs. That is, rather than using a single RIS 410 in the configuration illustrated in FIG. 4, two or more RISs 410 may be used. FIGS. 8A and 8B, described below, help illustrate how this can be done.

FIG. 8A is a simplified diagram illustrating how positioning of a UE 105 and/or channel estimation can be performed using a TRP 320 and two RISs 410-1 and 410-2 (collectively and generically referred to herein as RISs 410), with two corresponding RIS-reflected paths 820-1 and 820-2 (along with non-RIS-reflected path(s) 830), according to an embodiment. As noted, other configurations may employ even more RISs 410. In this configuration, processes similar to those described with regard to FIGS. 5 and 6 can be employed, but extended to account for the additional RIS 410-2, enabling channel estimation for channel h2 corresponding to a second RIS-reflected path 820-2 taken by a reference signal that reflects from a second RIS 410-2.

Depending on desired functionality, embodiments may estimate channels h1 and h2 in using different techniques. For example, according to a first technique each channel can be estimated one by one, using the previously-described techniques. According to this technique, for instance, h1 could be determined using the process of FIG. 5 or 6 and (optionally) the pattern illustrated in FIG. 7. In this technique, h2 would simply be treated as part of the non-RIS-reflected path(s) 430 of FIG. 4. Once h1 is solved, the process could be repeated for h2, where h1 is treated as part of the non-RIS-reflected path(s) 430 of FIG. 4 when solving for h2.

According to a second technique, h1 and h2 can be determined jointly. This can be done, for example, using the pattern illustrated in FIG. 8B. In this pattern, three reference signals are transmitted at three times, t1-t3. The different RISs 410 can use different weights for each reference signal, enabling h1 and h2 to be determined. For example, the channels for the reference signals at t1, t2, t3, can be represented respectively as:

$$H(t1)=h0+\text{alpha1}*h1+\text{alpha2}*h2,$$

$$H(t2)=h0+\text{alpha3}*h1+\text{alpha4}*h2,\text{ and}$$

$$H(t3)=h0+\text{alpha5}*h1+\text{alpha6}*h2. \tag{5}$$

Based on known values for weights alpha1 to alpha6, the estimated channel for h1 and h2 can be determined in a manner similar to the technique previously described for solving h1 using equations (1)-(4).

Figure 9A:
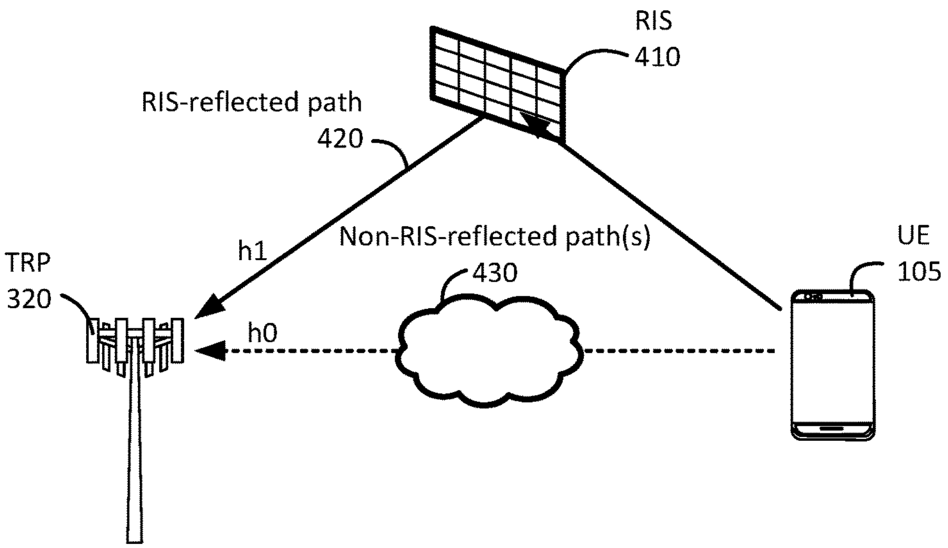
FIG. 9A illustrates a configuration for UE positioning and/or channel estimation in which the transmitting device comprises the UE and the receiving device comprises a TRP.

As previously indicated, techniques are not limited to DL transmissions where the transmitting device comprises a TRP 320 and the receiving device comprises a UE 105. FIG. 9A illustrates an embodiment in which the transmitting device comprises the UE 105 and the receiving device comprises the TRP 320. Although the configuration is the same as the configuration illustrated in FIG. 4, the roles of the UE 105 and TRP 320 may be reversed in some aspects. In particular, the UE 105 transmits the reference signals (e.g., UL reference signals such as UL-PRS, SRS, etc.).

Figure 9B:
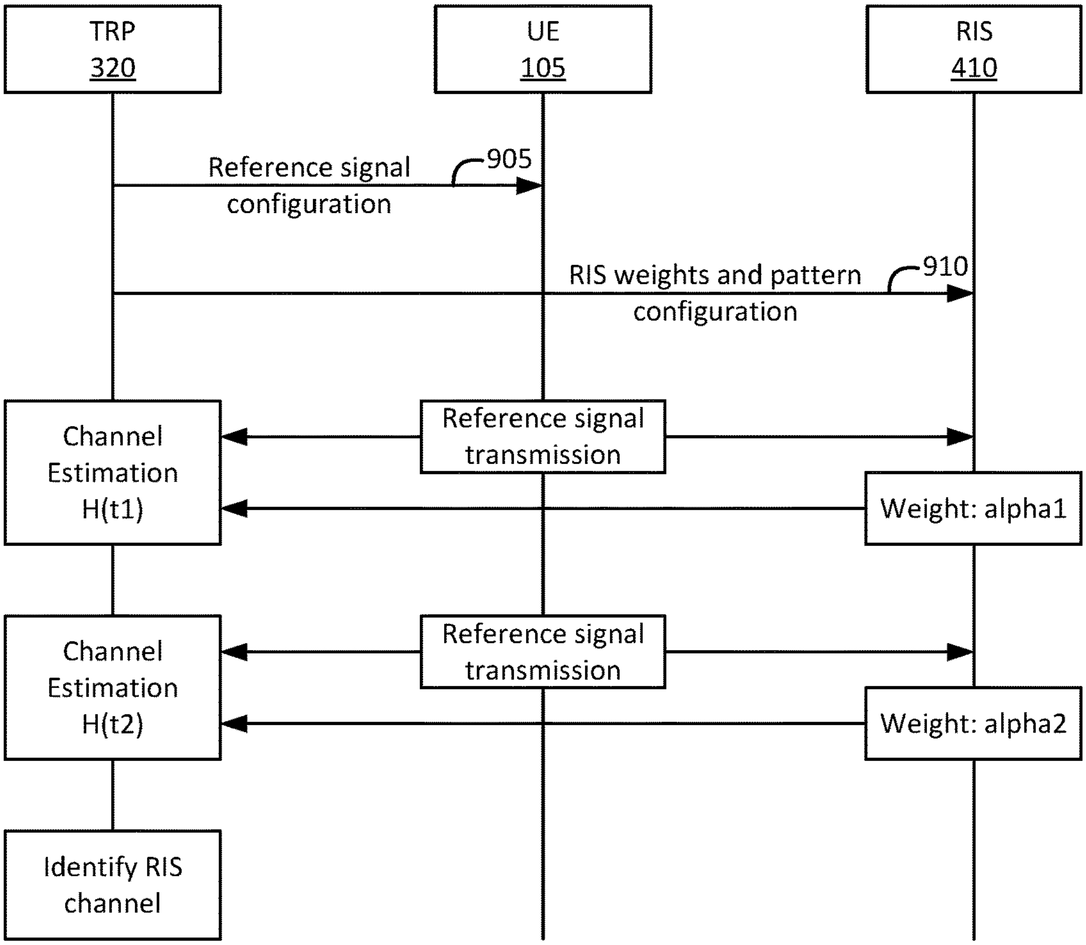
FIG. 9B illustrates a process by which channels h0 and h1 of the configuration of FIG. 9A may be determined.

FIG. 9B illustrates a process by which the embodiment of FIG. 9A may determine channels h0 and h1. As can be seen, the process illustrated in FIG. 9B largely echoes the process illustrated in FIG. 5, with the UE 105 performing the functions of the TRP 320, and vice versa. However, it can be noted that, in the process illustrated in FIG. 9B, the network may still coordinate the transmittal and reflection of the reference signals. As such, in the process of FIG. 9B, the TRP 320 still provides the UE 105 with reference signal configuration, as indicated at arrow 905. Further, because (in this example) the TRP 320 determines the RIS channel, it may not need to provide the UE 105 with RIS weights and pattern configuration. Instead, this configuration may only need to be sent to the RIS 410, as indicated at arrow 910. It can be noted that alternative embodiments may vary from the process illustrated in FIG. 9B including variations similar to those found in FIG. 6.

For the previously-described techniques in which RIS-aided positioning of a UE 105 is performed, the position of an RIS may need to be known or determined. According to some embodiments, this can be done using a receiving device with a known position. As described below with regard to FIG. 10

Figure 10:
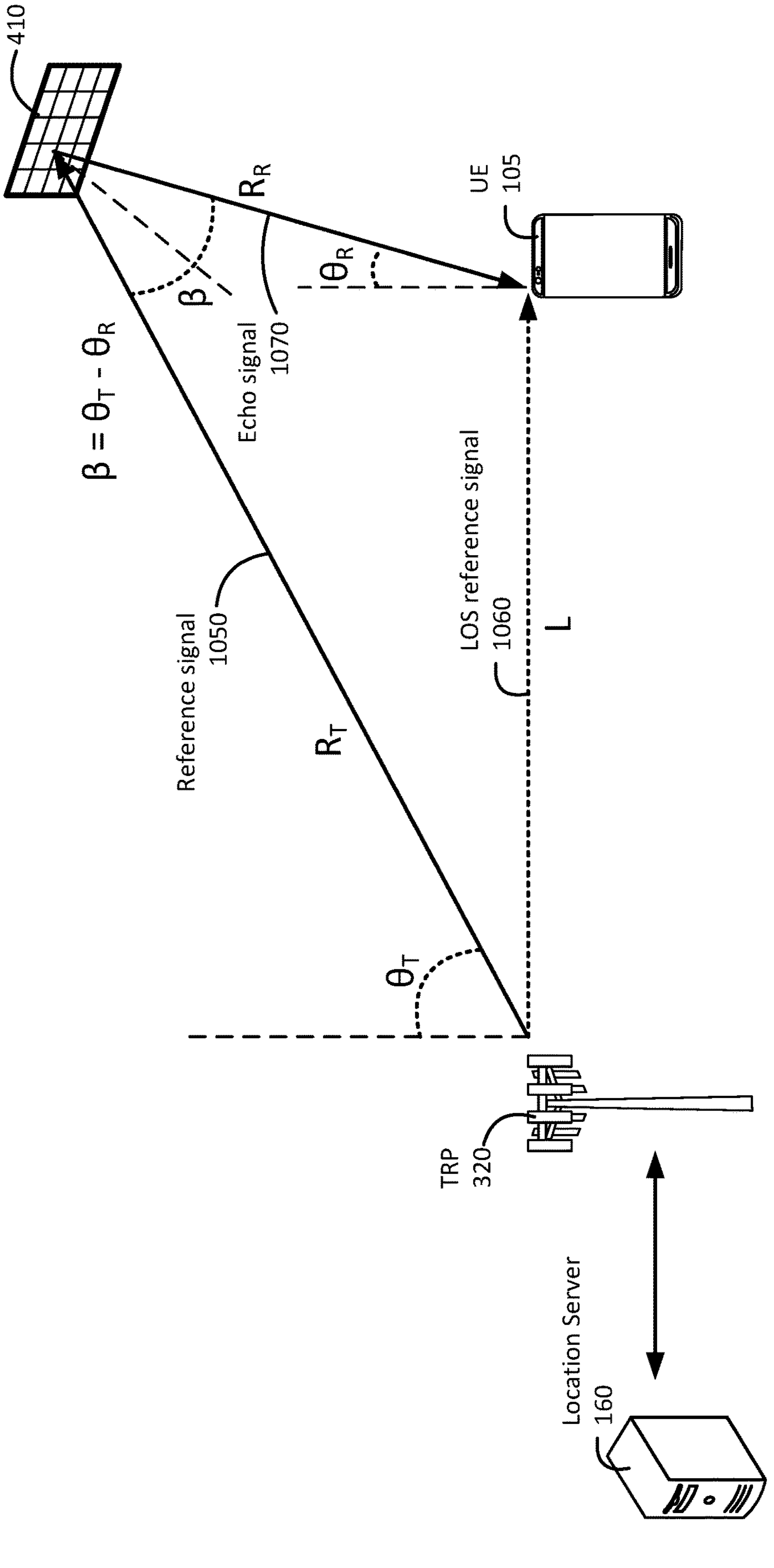
FIG. 10 is an illustration of a configuration in which the location of an RIS can be determined using a transmitting device and receiving device.

FIG. 10 is an illustration of a configuration in which the location of an RIS 410 can be determined using a transmitting device and receiving device with known locations. Although, in this example, the transmitting device comprises a TRP 320 and the receiving device comprises a UE 105, embodiments are not so limited. The transmitting and/or receiving devices can include any combination of UEs, TRPs, and/or other devices with known (or determinable) locations. Location can be determined using any of a variety of techniques, including RAT-based techniques, GNSS, etc.

The position of the RIS 410 can be determined mathematically by using the one or more reference signals 1050, 1060 to solve for the distance, $R_R$, of the RIS 410 from UE 105, as well as angle, $\theta_R$. It can be noted that the reference direction from which the angle $\theta_R$ (and angle $\theta_T$) is measured may be measured from true north or based on any coordinate system used by the network for positioning (e.g., geographical coordinates, East-North-Up (ENU), etc.). As noted hereafter, solving for $R_R$ and $\theta_R$ can be accomplished based on a known position of the UE 105 relative to TRP 320 (to determine distance L). Further, reference signals 1050, 1060 may be distinguished by the UE 105 using the previously-described techniques for channel estimation, for example.

The distance $R_R$ can be determined based on a time difference at the UE 105 of receiving the Line-Of-Sight (LOS) reference signal 1060 and echo signal 1070. $R_{sum}$ may be defined as follows:

$$R_{sum}=R_T+R_R, \tag{6}$$

where $R_T$ is the distance between the TRP 320 and RIS 410, and $R_R$ is the distance between the RIS 410 and UE 105. Using equation (6) and the geometry illustrated in FIG. 10, $R_R$ may then be determined as follows:

$$R_R = R_{sum} - \frac{R_{sum}^2 - L^2}{2(R_{sum} + L * \sin\theta_R)}. \tag{7}$$

$R_{sum}$ can be determined using (i) the time difference between the LOS reference signal 1060 and echo signal 1070, and (ii) the known distance between the TRP 320 and UE 105. This can be expressed mathematically as:

$$R_{sum}=(T_{Rx\_echo}-T_{Rx_{LOS}}+\Delta)*c+L, \tag{8}$$

where L is the distance between the TRP 320 and UE 105, $T_{Rx\_echo}$ is the time (e.g., ToA) at which the echo signal 1070 is received at the UE 105, $T_{Rx\_LOS}$ is the time (e.g., ToA) at which the LOS reference signal 1060 is received at the UE 105, and c is the speed of reference signals 1050, 1060, and 1070 (e.g., the speed of light). It can be noted that, because reflected echo signal 1085 and reflected LOS reference signal 1090 travel along the same propagation path from the UE 105 to the UE 105, these signals experience the same delay and are effectively canceled out in the time difference $T_{Rx\_echo}-T_{Rx_{LOS}}$ of equation (8). Again, because the location of the UE 105 is known, distance L can be determined based on the difference in the known location of the UE 105 and the known location of the TRP 320. According to some embodiments, almanacs of TRP locations may be stored by a location server 160 and/or UE 105).

The term Δ represents a time gap (if any) between the transmission of the LOS reference signal 1060 and the transmission of the reference signal 1050. In some implementations, however, the LOS reference signal 1060 and reference signal 1050 may be the same RF signal, in which case the value for time gap Δ would be zero. In embodiments where the UE 105 determines the difference $T_{Rx\_echo}-T_{Rx_{LOS}}$, timing of LOS reference signal 1060 and reference signal 1050 may be provided to the UE 105 beforehand (e.g., in a communication session with the location server 160 or in a configuration provided to the UE 105 by the serving TRP 320). Because this difference is dependent solely on when signals arrive, rather than when they are transmitted, no synchronizations needed between the transmitter (TRP 320) and receiver (UE 105). This can be advantageous in many circumstances.

Returning to equation (7), to solve for $\theta_R$ embodiments can use different techniques, depending on desired functionality and other factors. According to some embodiments, the UE 105 can determine an AoA measurement of $\theta_R$ using an antenna array. Alternatively, $\theta_R$ may be solved using multilateration in cases where multiple UEs (or multiple measurements from a single UE 105) can be made. (Multilateration may be used in other ways to determine the location of RIS 410, as discussed hereafter with regard to FIG. 12.)

Figure 11A:
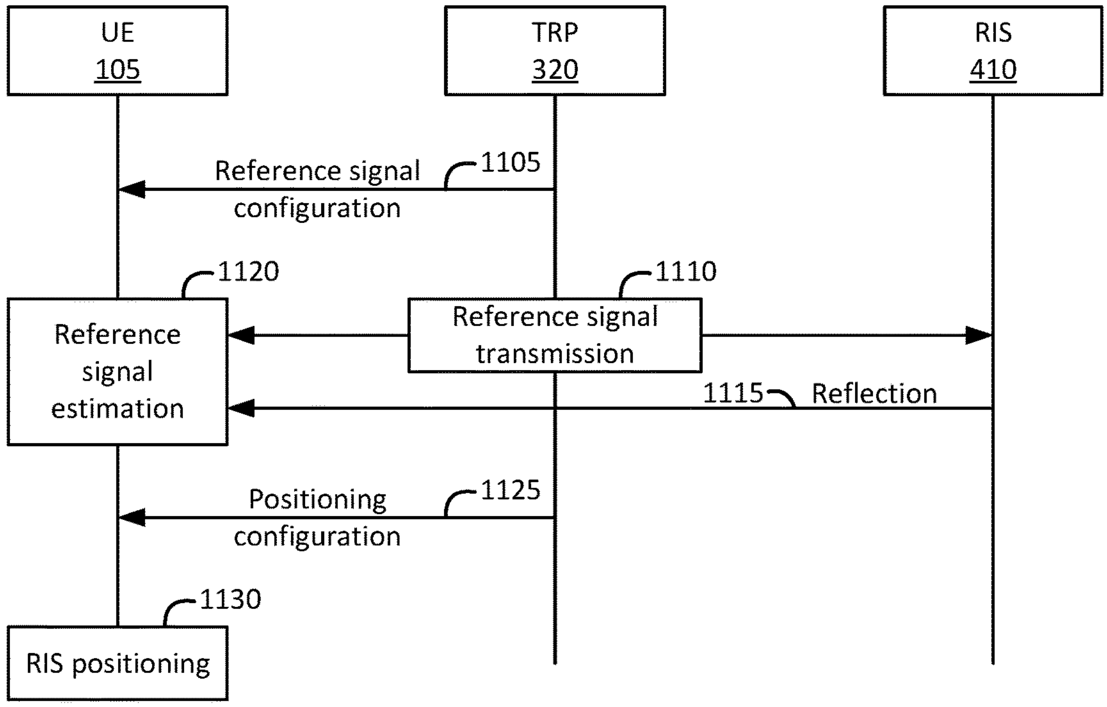
FIGS. 11A and 11B are call flow diagrams illustrating processes by which the location of an RIS can be determined using the configuration illustrated in FIG. 10.
Figure 11B:
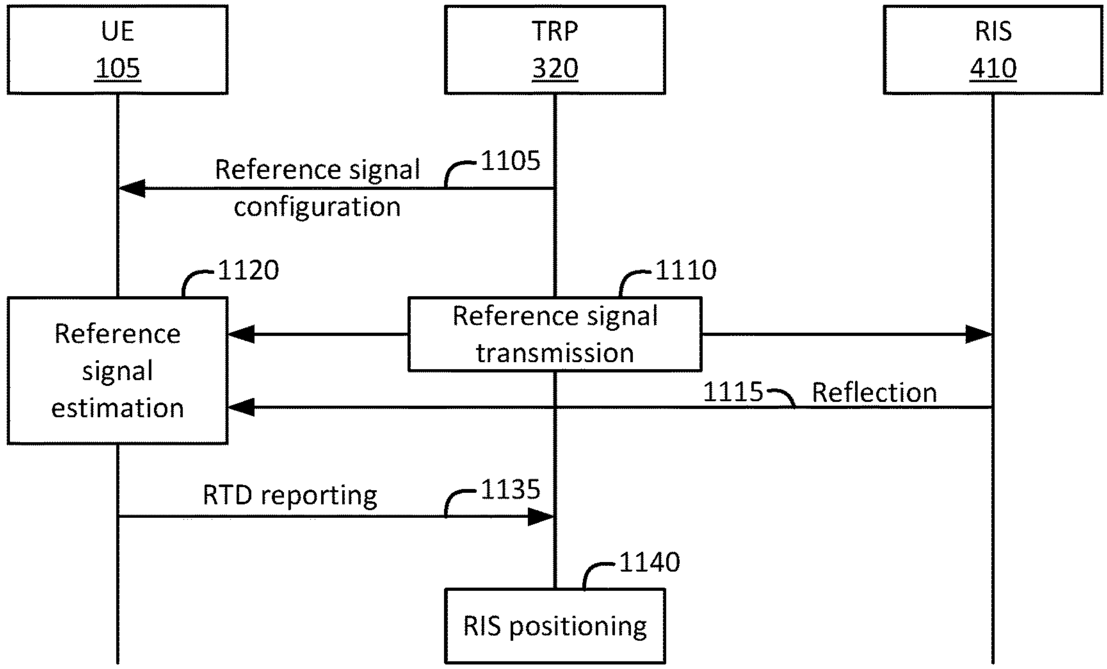

Having determined the values of L, $R_{sum}$, and $\theta_R$, the value for $R_R$ can be determined using equation (7), and the location of the RIS 410 (relative to the UE 105) can be determined using $R_R$ and $\theta_R$. Further, if the absolute position of the UE 105 is known, the absolute position of the RIS 410 can be determined. FIGS. 11A and 11B are examples of how signals may be transmitted to effectuate this process of determining the location of the RIS 410.

FIG. 11A is a call flow diagram illustrating a first process by which the location of an RIS 410 can be determined using the configuration illustrated in FIG. 10. Again, alternative embodiments may be used in other configurations in which different transmitting and/or receiving devices are used. In the process illustrated in FIG. 11A the UE 105 may determine the position of the RIS 410. As such, the process may be considered a UE-centric or UE-based determination of the position of the RIS 410.

As indicated at arrow 1105, the process can begin with the TRP 320 providing the UE 105 with reference signal configuration. This reference signal configuration may be similar to configurations discussed with regard to FIGS. 5 and 6 (at arrows 505 and 605). As such, the configuration can include timing and/or frequency information regarding the reference signal(s) to be used in the positioning of the RIS 410. Moreover, the reference signal configuration can further include information regarding the RIS 410, such as the RIS ID. Ultimately, the reference signal configuration provided at arrow 1105 enables the UE 105 to measure the reference signal(s) transmitted by the TRP 320 for the positioning of the RIS 410

At block 1110, the TRP 320 transmits the reference signal, which is received by the UE 105. Similarly, the reference signal transmitted at block 1110 is reflected off of the RIS 410 and the reflection (represented by arrow 1115) is also received by the UE 105. Although not illustrated in FIG. 11A, it will be understood that the TRP 320 may can configure/control the RIS 410 to help ensure the reflection (arrow 1115) is directed toward the UE 105. This can be informed, according to some embodiments, on an estimated position of the UE 105. In some embodiments, the location of the UE 105 may be provided directly to the TRP 320 by the UE 105, or may be provided to the TRP 320 by a location server. According to some embodiments and/or instances, the TRP 320 may already be engaged in controlling the RIS 410 in real time to reflect signals from the TRP 320 to the UE 105 (and vice versa) for communication and/or other purposes. In such instances, the TRP 320 may not necessarily rely on a determined position of the UE 105, but may instead rely on techniques used in communication (e.g., CSI-RS/SRS beam selection). Alternatively, according to some embodiments, a location server and/or the UE 105 may control the RIS 410.

At block 1120, the UE 105 performs reference signal estimation. According to some embodiments, reference signal estimation may comprise measuring TOAs of the reference signal (e.g., a ToA of the signal received directly from the TRP 320, and a ToA of the reflection (arrow 1115) by the RIS 410) to determine $T_{Rx\_echo}-T_{Rx_{LOS}}$, as previously described with regard to equation (8). As previously described, the UE 105 may also take an AoA measurement of the signal reflected from the RIS 410 to determine the angle $\theta_R$.

As indicated at arrow 1125, the TRP 320 may provide the position configuration to the UE 105. The positioning configuration 1125 may comprise information that can be used by the UE 105 to determine the position of the RIS based, for example, on equations (6)-(8). This may include, for example, information to enable the UE 105 to determine length L (e.g., of FIG. 10) between the TRP 320 and UE 105. As such, this can include location of the TRP 320 (e.g., an absolute location or a location relative to the UE 105). Using this information, then, the UE 105 determines the location of the RIS, as indicated at block 1130.

FIG. 11B is a call flow diagram illustrating a second process by which the location of an RIS 410 can be determined using the configuration illustrated in FIG. 10. Again, alternative embodiments may be used in other configurations in which different transmitting and/or receiving devices are used. In the process illustrated in FIG. 11B the TRP 320 may determine the position of the RIS 410. As such, the process may be considered a UE-assisted determination of the position of the RIS 410.

The operations performed in items 1105-1120 of FIG. 11B correspond with the operations performed in items 1105-1120 of FIG. 11A, as described previously. In FIG. 11B, however, rather than receiving a positioning configuration and determining the position of the RIS, the UE 105 provides measurement information to the TRP 320 to enable the TRP to perform RIS positioning. In particular, the UE 105 may provide Rx Time Difference (RTD) reporting (as indicated at arrow 1135), where the RTD value is reflective of $T_{Rx\_echo}-T_{Rx_{LOS}}$. The TRP 320 may therefore use this information to perform RIS positioning, as shown at block 1140 using, for example, equations (6)-(8).

As previously indicated, alternative embodiments may use multiple reference signals. That is, rather than transmit a single reference signal (e.g., at block 1110), embodiments may transmit two or more reference signals. For example, different reference signals may correspond with reference signal 1050 and LOS reference signal 1060. As previously noted, this can result in a nonzero value for $\Delta$ in equation (8). Additionally or alternatively, different reference signals can be used in the manner indicated in processes illustrated in FIGS. 5 and 6, in which the RIS uses different weights to reflect the reference signals, enabling the UE 105 to distinguish the reflected signal (reflection at arrow 1115) from a non-reflected signal using channel estimation in the manner previously described.

Figure 12:
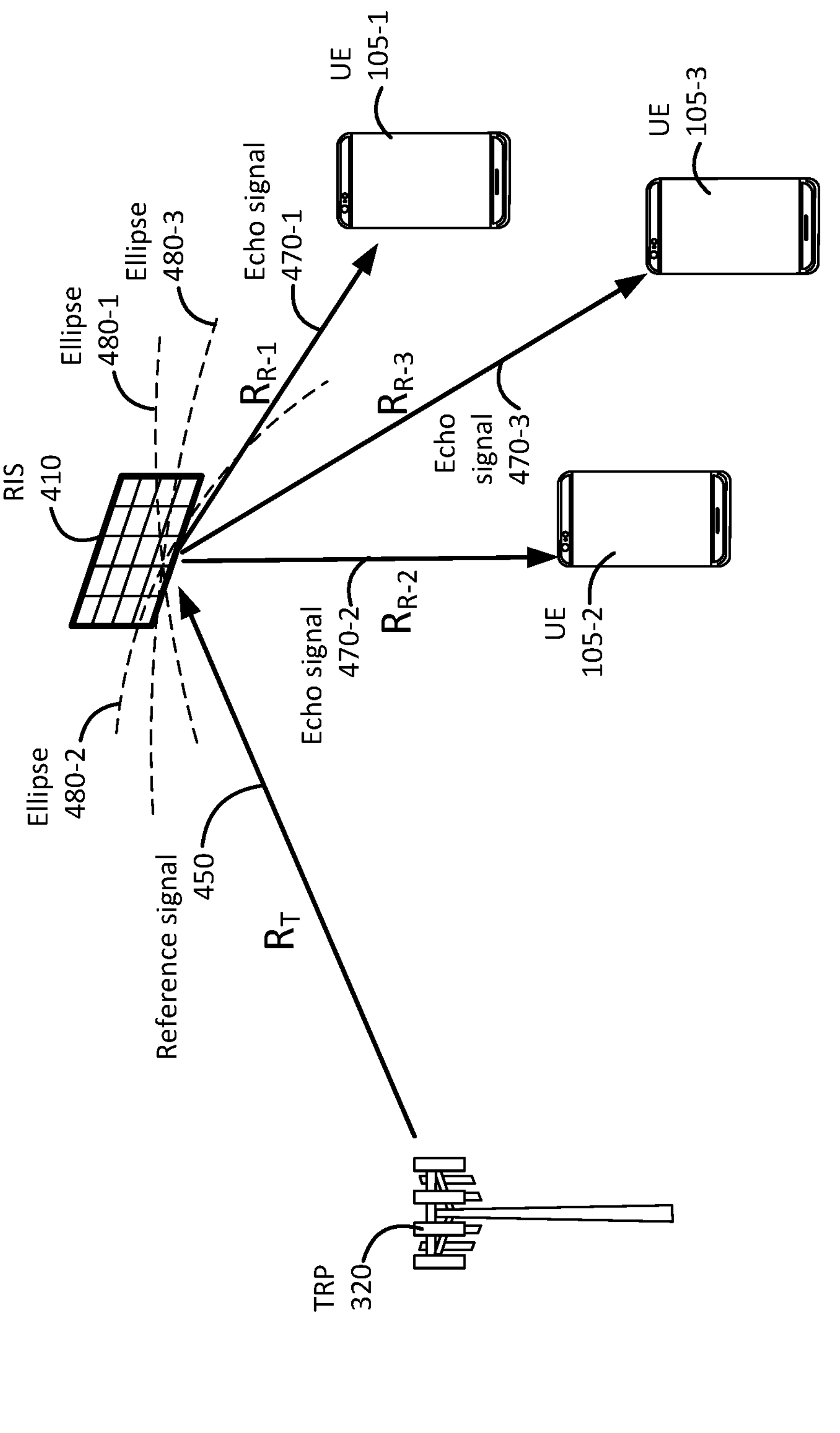
FIG. 12 is a simplified diagram illustrating an example variation to the configuration illustrated in FIG. 10, which may be used according to embodiments.

FIG. 12 is a simplified diagram illustrating an example variation to the configuration illustrated in FIG. 10, which may be used according to embodiments. Here, rather than a single UE 105, multiple UEs 105-1, 105-2, and 105-3 (collectively and generically referred to herein simply as UEs 105) are used. Again, embodiments are not so limited, and receiving devices may comprise any number of devices, including devices and/or device types in addition or alternative to UEs 105. Furthermore, as previously noted, in addition to RIS 410 directing signals from the RIS 410 and TRP 320 to a first UE 105-1, the RIS 410 and/or other RISs (not shown) may direct similar signals to other UEs (e.g., UE 105-2 and/or UE 105-3).

The process of determining the location of the RIS 410 may be generally similar to the process illustrated in FIG. 10 and described in conjunction with FIGS. 10-111B. However, because multiple UEs 105 are used, angle information may not be needed. That is, rather than (or in addition to) determining the position of the RIS 410 using distance $R_R$ and angle $\theta_R$ (shown in FIG. 10), the position may be determined instead using multilateration. To do so, each UE 105 may receive a respective echo signal 470 from the RIS 410, as well as a direct reference signal from the TRP 320 (e.g., LOS reference signal 1060 of FIG. 10) to determine a respective $R_{sum}$ using, for example, equation (8). (To reduce clutter, direct reference signals are not illustrated in FIG. 12.)

Because $R_{sum}$ for each UE 105 is the sum of $R_T$ and the respective $R_R$ for the RIS 410, the value of $R_{sum}$ can be used to form a respective ellipse 480 for each RIS 410. In the example in FIG. 12, and $R_{sum}$ may be calculated for UE 105-1, UE 105-2, and UE 105-3, resulting in respective ellipses 480-1, 480-2, and 480-3. For each ellipse 480, the TRP 320 and the respective UE 105 are foci of the respective ellipse. (Again, to reduce clutter, only applicable portions of ellipses 480 are illustrated in FIG. 12) The device determining the location of the RIS 410 (e.g., any/all of the UEs 105, the TRP 320, and/or the location server 160 (not illustrated in FIG. 12)) may do so by determining the point at which the ellipses 480 converge. As such, no AoA or other angular determinations may be needed to determine the location of the RIS 410.

The number of UEs 105 (or other receiving devices) used to determine the position of the RIS 410 in this manner may vary, depending on the situation. A larger or smaller number of UEs 105 than illustrated in FIG. 12, for example, can be used. In some circumstances, such as when two UEs 105 are used, there may be ambiguities (e.g., multiple convergence points) in the position of the RIS 410. In such instances, other data can be leveraged to resolve the ambiguities. This other data can include, for example, previous measurements, other (previous and/or simultaneous) position determinations for the RIS 410, or the like. (As noted previously, an RIS ID may be included in and/or associated with wireless reference signals transmitted by the TRP 320, enabling a UE 105 receiving redirected signals from multiple RISs to separately determine a corresponding ellipse for each.)

It can be noted that embodiments for determining the location of the RIS 410 in the manner illustrated in FIG. 12 may follow a similar process as those illustrated in FIGS. 11A and 11B. Because multiple UEs are used, the functionality of the UE illustrated in FIGS. 11A and 11B may be replicated for all UEs 105. That said, the determination of the position of the RIS at block 1130 of FIG. 11A may be performed by a single UE 105, if desired. To do so, the UE 105 may perform multilateration calculations based on positioning information (e.g., ToA measurements and/or time-difference determinations) received from the other UEs. This information may be received directly from the other UEs (e.g., using sidelink communications) or indirectly via the location server 160 and/or TRP 320.

Although embodiments for multilateration described above with regard to FIG. 12 use multiple UEs, embodiments are not so limited. Alternative embodiments may use a single UE in different locations taking different measurements. In other words, rather than (or in addition to) having multiple UEs, embodiments may utilize a single UE that takes measurements at multiple locations. These measurements can be used by the UE 105 and/or network to perform multilateration in the manner described above.

Figure 13:
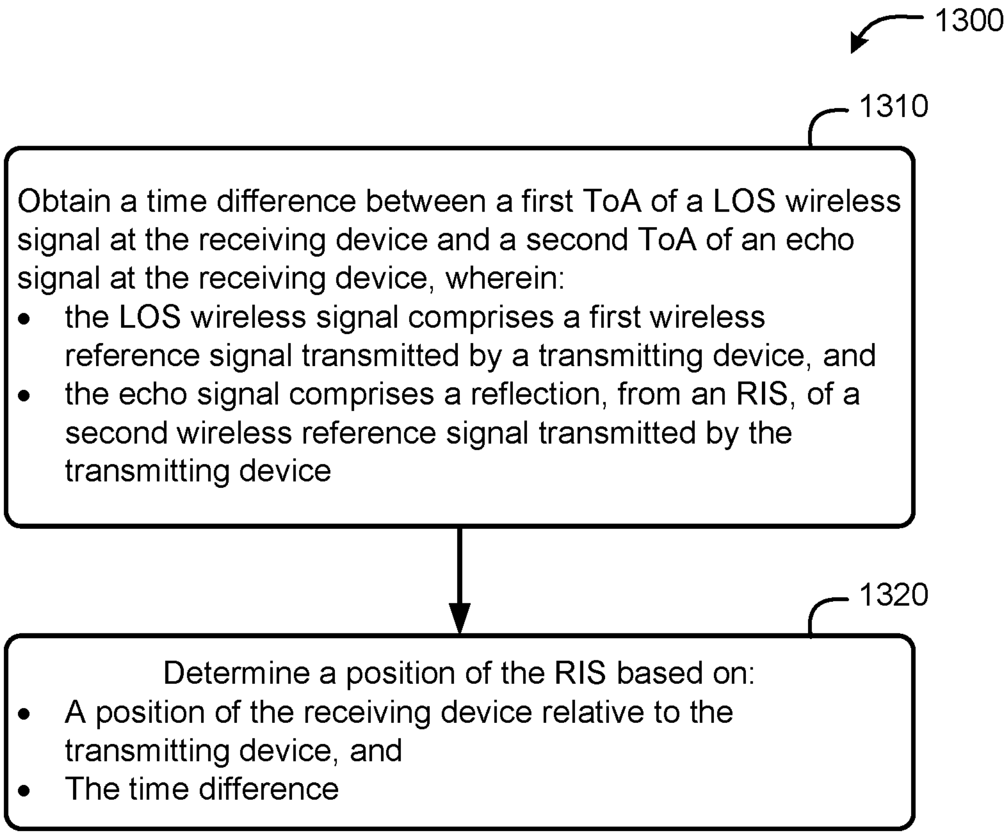
FIG. 13 is a flow diagram of a method of determining the location of an RIS in a wireless communication network, according to an embodiment.

FIG. 13 is a flow diagram of a method 1300 of determining the location of an RIS in a wireless communication network, according to an embodiment. Here, the receiving device may correspond with the UE 105 and the transmitting device may correspond with TRP 320, as described in FIGS.

Figure 16:
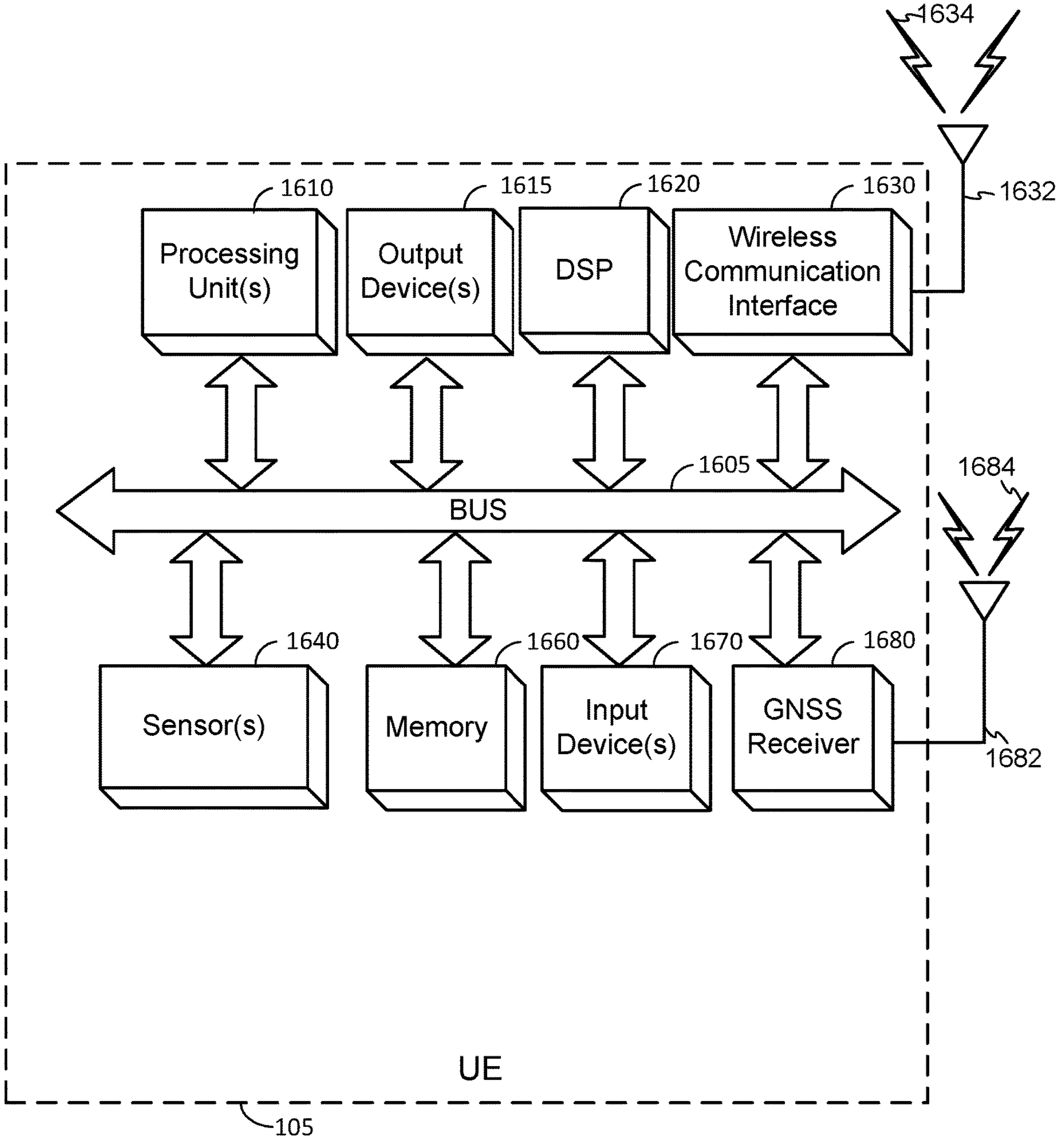
FIG. 16 is a block diagram of an embodiment of a UE, which can be utilized in embodiments as described herein.
Figure 17:
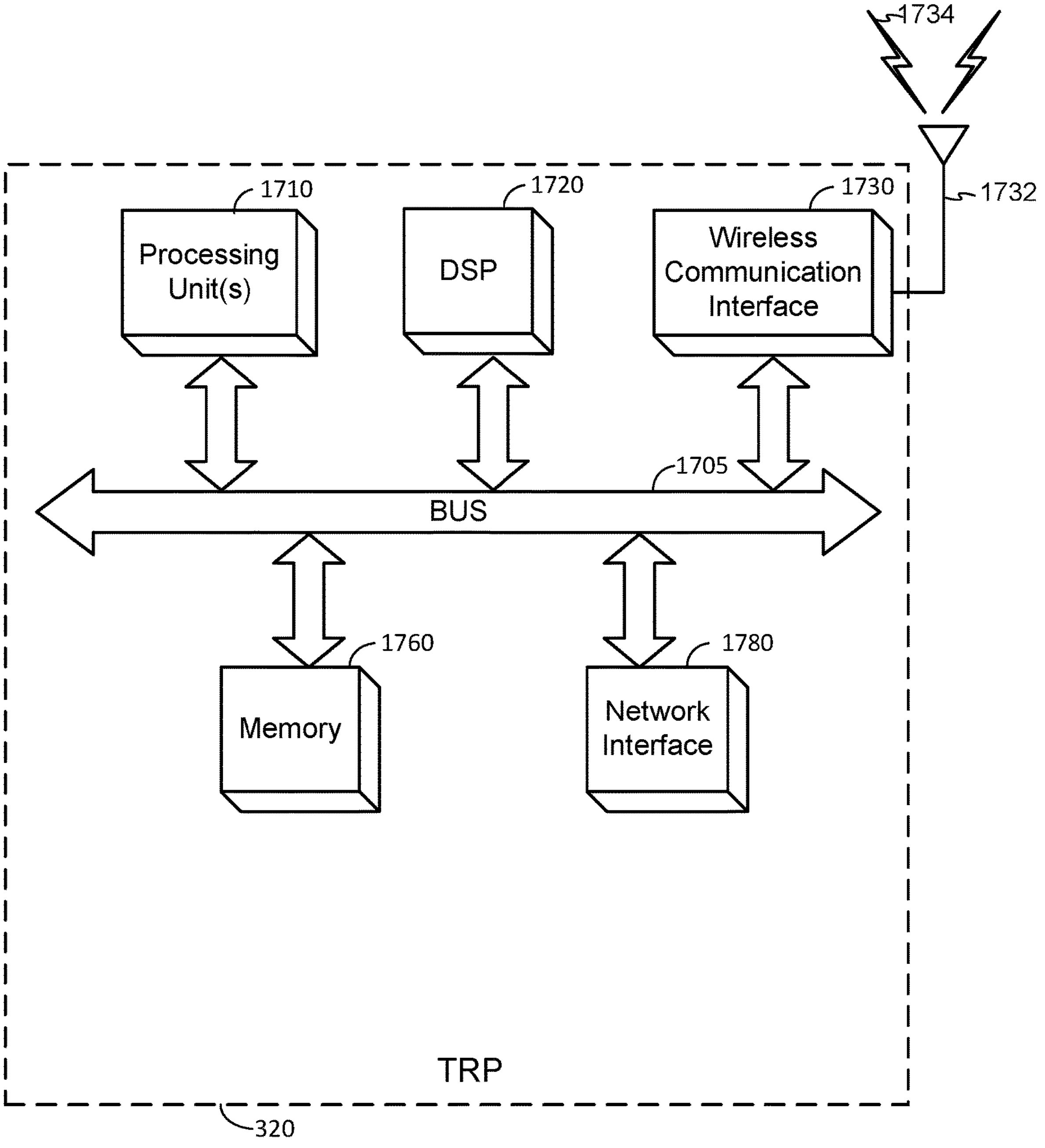
FIG. 17 is a block diagram of an embodiment of a TRP, which can be utilized in embodiments as described herein.
Figure 18:
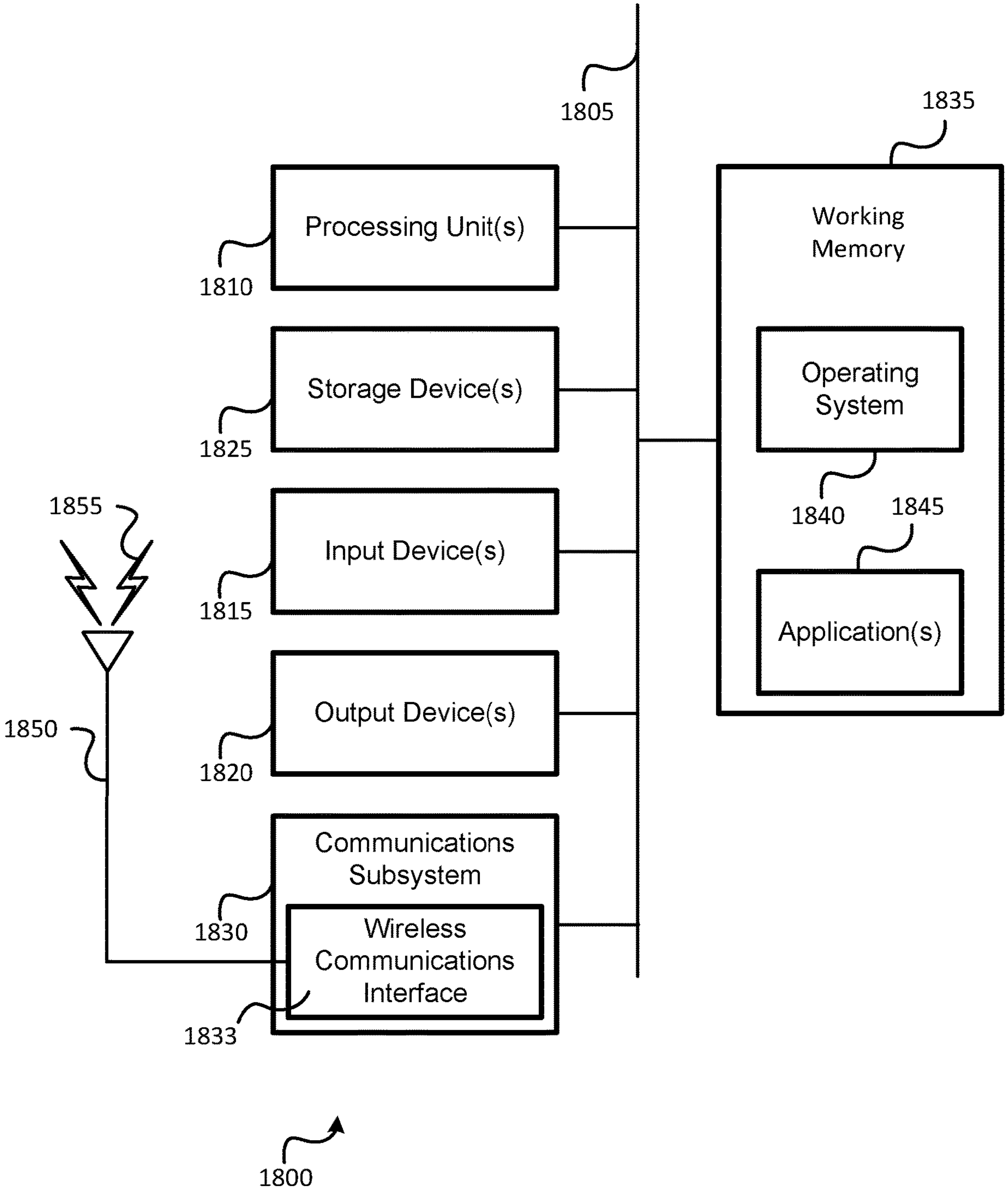
FIG. 18 is a block diagram of an embodiment of a computer system, which can be utilized in embodiments as described herein.

10-11A. However, as noted, receiving and transmitting devices may vary, depending on desired functionality. Accordingly, the various operations illustrated in FIG. 13 may correspond with functionality of a UE, TRP, or location server, and aspects of the method 1300 may correspond to the functionality of different components described with regard to FIGS. 11A and/or 11B. Means for performing the functionality illustrated in one or more of the blocks shown in FIG. 13 may be performed by hardware and/or software components of a UE, TRP, or computer system. Example components of a UE are illustrated in FIG. 16, example components of a TRP are illustrated in FIG. 17, and example components of a computer system (e.g., computer server) are illustrated in FIG. 18, all of which are described in more detail below.

At block 1310, the functionality comprises obtaining a time difference between a first ToA of a LOS wireless signal at the receiving device and a second ToA of an echo signal at the receiving device, wherein (i) the LOS wireless signal comprises a first wireless reference signal transmitted by a transmitting device, and (ii) the echo signal comprises a reflection, from an RIS, of a second wireless reference signal transmitted by the transmitting device. As indicated in the embodiments described previously, this time difference may correspond with time difference $T_{Rx\_echo}-T_{Rx_{LOS}}$ of equation (8). As described in the embodiments above, the transmitting device may comprise a TRP (including a gNB or eNB, for example). Where the transmitting device comprises a TRP, the wireless reference signals may comprise a DL reference signal such as a PRS, SSB, Tracking Reference Signal (TRS), Channel State Information Reference Signal (CSIRS), Demodulation Reference Signal (DMRS), or the like. Where the transmitting device comprises a UE, the wireless reference signals may comprise a UL reference signal such as SRS, UL-PRS, etc. further, as noted above, the first and second wireless signals may comprise separate reference signals, or may comprise a single reference signal transmitted by the transmitting device and following two separate paths.

At block 1320, the functionality comprises determining a position of the RIS based on a position of the receiving device relative to the transmitting device, and the time difference. As illustrated in the embodiments above, the position of the receiving device relative to the transmitting device may comprise a distance L used to determine $R_{sum}$ and ultimately $R_R$. According to some embodiments, this distance may be determined by a location server or receiving device and may be derived from known positions of the transmitting and receiving devices. These locations may be stored in an almanac or index of such network entities may be accessed and/or maintained by the location server.

As described in further detail hereafter, aspects of the method 1300 for determining the location of an RIS may be incorporated into a method of channel estimation for positioning using an RIS, in the manner previously described with regard to FIGS. 4-9B. An example is illustrated in FIG. 16. First, however, an example of a method of channel estimation for positioning using an RIS is provided in FIG. 14 and described below.

Figure 14:
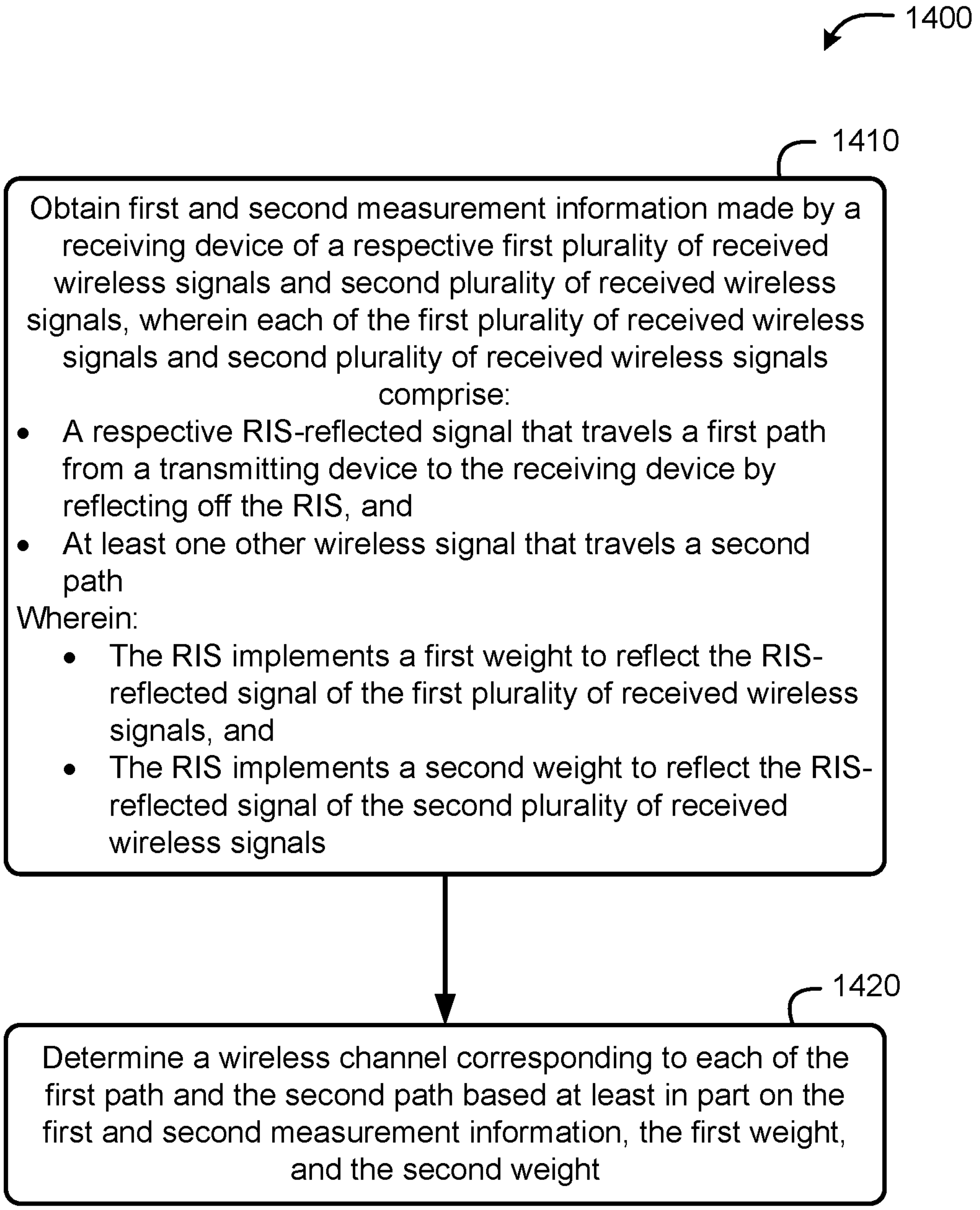
FIG. 14 is a flow diagram of a method of channel estimation in a wireless communication network, according to an embodiment.

FIG. 14 is a flow diagram of a method 1400 of channel estimation, according to an embodiment. As illustrated in FIG. 4, according to some embodiments the receiving device may correspond with the UE 105 and the RIS may correspond with RIS 410, as described in FIGS. 10-11A, although, as noted, receiving and transmitting devices may vary. Accordingly, the various operations illustrated in FIG. 14 may correspond with functionality of a network-connected device, such as a UE, TRP, or location server. And aspects of the method 1400 may correspond to the functionality of different components described with regard to FIGS. 4-9B. Means for performing the functionality illustrated in one or more of the blocks shown in FIG. 14 may be performed by hardware and/or software components of a UE, TRP, or computer system. Again, example components of a UE are illustrated in FIG. 16, example components of a TRP are illustrated in FIG. 17, and example components of a computer system (e.g., computer server) are illustrated in FIG. 18, all of which are described in more detail hereafter.

At block 1410, the functionality comprises obtaining first and second measurement information made by a receiving device of a respective first plurality of received wireless signals and second plurality of received wireless signals. Each of the first plurality of received wireless signals and second plurality of received wireless signals comprises a respective RIS-reflected signal that travels a first path from a transmitting device to the receiving device by reflecting off the RIS, and at least one other wireless signal that travels a second path. The RIS implements a first weight to reflect the RIS-reflected signal of the first plurality of received wireless signals, and the RIS implements a second weight to reflect the RIS-reflected signal of the second plurality of received wireless signals. According to some embodiments, the first weight may be different from the second weight in amplitude, phase, or both. As indicated in FIGS. 5, 6, and 9B a transmitting device can transmit multiple reference signals, wherein the RIS can apply different weights to reflect each signal. According to some embodiments, equations (1)-(4) may be used in a manner described herein for channel estimation. In such embodiments, first and second measurement information may respectively correspond with H(t1) and H(t2), and first and second weights may respectively correspond with alpha1 and alpha2.

Means for performing the functionality at block 1410 may vary, depending on the device performing the functionality. For example, the means may comprise a bus 1605, processing unit(s) 1610, Digital Signal Processor (DSP) 1620, wireless communication interface 1630, memory 1660, and/or other components of a UE, as illustrated in FIG. 16. Additionally or alternatively, the means may comprise a bus 1705, processing unit(s) 1710, DSP 1720, wireless communication interface 1730, memory 1760, and/or other components of a TRP, as illustrated in FIG. 17. Additionally or alternatively, the means may comprise a bus 1805, processing unit(s) 1810, communications subsystem 1830, working memory 1835, and/or other components of a computer system, as illustrated in FIG. 18.

At block 1420, the functionality comprises determining a wireless channel corresponding to each of the first path and the second path based at least in part on the first and second measurement information, the first weight, and the second weight. As described previously, equations (1)-(4) may be used to determine the wireless channel corresponding to each of the first path and the second path. In such embodiments, the first path may correspond with h1 and may therefore be solved using equation (3), and the second path may correspond with h0 and may therefore be solved using equation (4).

Means for performing the functionality at block 1420 may vary, depending on the device performing the functionality. For example, the means may comprise a bus 1605, processing unit(s) 1610, DSP 1620, memory 1660, and/or other components of a UE, as illustrated in FIG. 16. Additionally or alternatively, the means may comprise a bus 1705, processing unit(s) 1710, DSP 1720, memory 1760, and/or other components of a TRP, as illustrated in FIG. 17. Additionally or alternatively, the means may comprise a bus 1805, processing unit(s) 1810, working memory 1835, and/or other components of a computer system, as illustrated in FIG. 18.

As indicated in the embodiments illustrated in FIGS. 5, 6, and 9B, alternative embodiments may implement additional or alternative functions. For example, according to some embodiments of the method 1400, the determining at block 1420 may be performed by the receiving device. Again, depending on desired functionality, the receiving device may comprise a UE or a TRP. Additionally or alternatively, according to some embodiments, the determining may be performed by a separate device from the receiving device, wherein obtaining the first and second measurement information comprises receiving the first and second measurement information from the receiving device with the separate device. As indicated in FIGS. 5 and 9B, according to some embodiments, the receiving device may comprise a UE and the separate device may comprise a serving TRP of the receiving device. Moreover, according to some embodiments, the separate device may comprise the transmitting device.

Some embodiments of the method 1400 may further involve configuring the RIS. For example, according to some embodiments, the method 1100 may further comprise configuring the RIS to implement the first weight to reflect the RIS-reflected signal of the first plurality of received wireless signals and implement the second weight to reflect the RIS-reflected signal of the second plurality of received wireless signals. In such embodiments, configuring the RIS may comprise indicating, to the RIS, a pattern by which the RIS is to implement the first weight and the second weight. Further, in such embodiments, the method 1400 may further comprise indicating, to the receiving device, the pattern by which the RIS is to implement the first weight and the second weight.

According to some embodiments, an identifier may be used to help differentiate the first and second plurality of wireless signals. For example, according to some embodiments, the first plurality of received wireless signals may correspond to a first transmitted PRS having a first ID and the second plurality of received wireless signals may correspond to a second transmitted PRS having a second ID.

As illustrated in FIGS. 8A and 8B, additional RISs and weights may be used to perform additional channel estimation. For example, according to some embodiments, the method 1400 may further comprise obtaining third measurement information made by the receiving device of a respective third plurality of received wireless signals comprising (i) a respective RIS-reflected signal that travels a third path from the transmitting device to the receiving device by reflecting off a second RIS, and (ii) at least one other wireless signal that travels the second path. In such embodiments, the RIS may implement a third weight to reflect the RIS-reflected signal of the third plurality of received wireless signals. Such embodiments may further comprise determining a wireless channel corresponding to the third path based at least in part on the third measurement information and the third weight.

According to some embodiments, the method may further comprise determining the location of a UE (which may be the receiving device or transmitting device). Additionally or alternatively, as indicated with regard to FIGS. 10-12, the channel estimation enabled by the embodiments described with regard to FIGS. 4-9B can be used to determine a location of the RIS. For example, according to some embodiments, the method 1400 may further comprise determining an angle at the receiving device of the first path, wherein determining the location of the RIS is further based at least in part on the angle. The angle may comprise, for example, $\theta_R$ of equation (7) described above. Additionally or alternatively, multilateration may be used, as described with regard to FIG. 12. In such embodiments, the second path may comprise a direct path from the transmitting device to the receiving device, and the method may further comprise for the first plurality of received wireless signals, the second plurality of received wireless signals, or both: using the determined wireless channel to identify the respective RIS-reflected signal, determining a length of the first path based on a timing different between receiving the respective RIS-reflected signal and the respective at least one other wireless signal that travels the direct path, and determining a location of the RIS based at least in part on the determined a length of the first path, a location of the transmitting device, and a location of the receiving device.

Figure 15:
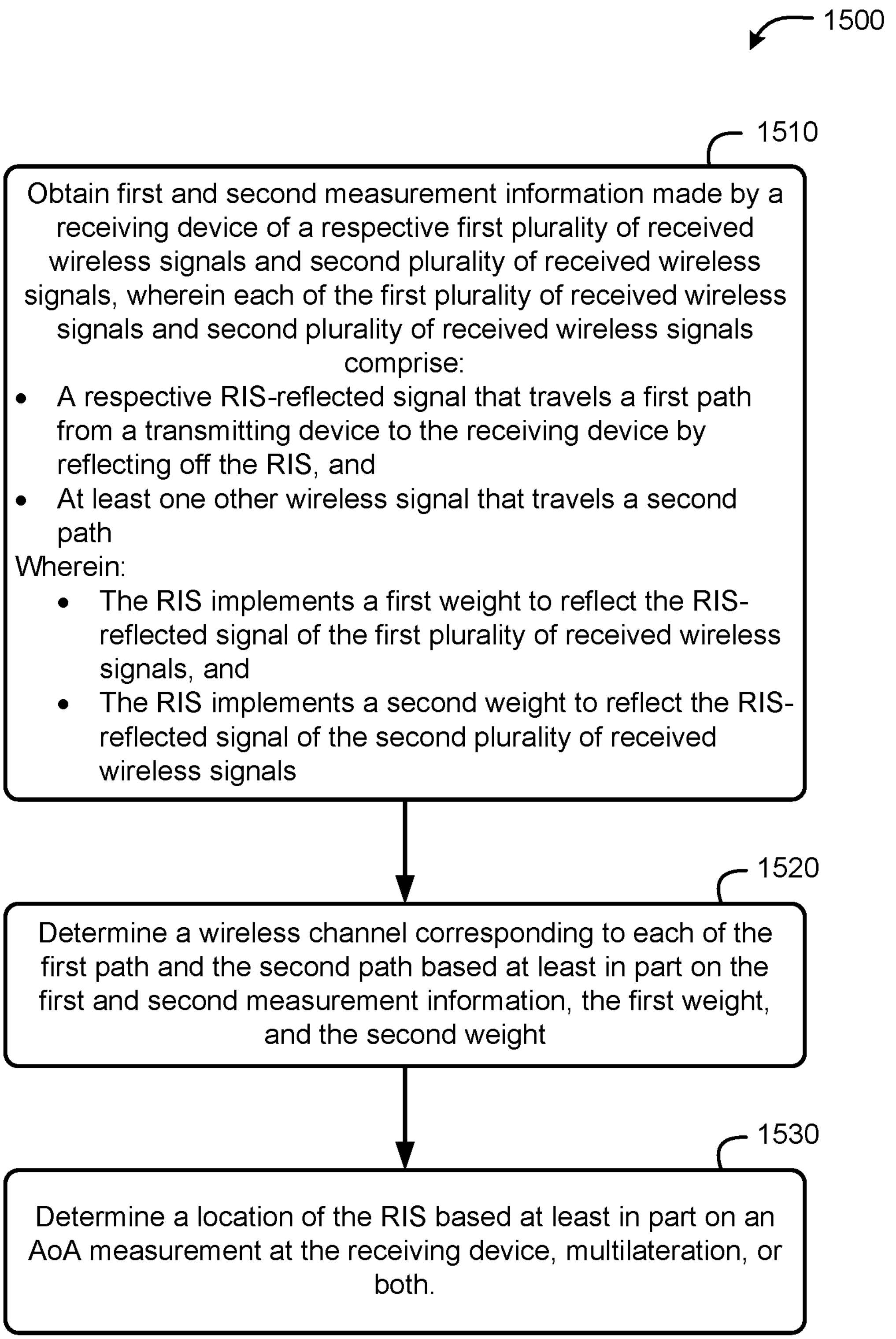
FIG. 15 is a flow diagram illustrating a variation of FIG. 14 that further specifies the determination of the location of the RIS.

FIG. 15 is a flow diagram of a method 1500 that provides a variation of method 1400 in which the location of the RIS is determined. The functionality at blocks 1510 and 1520 echo that of blocks 1410 and 1420 of FIG. 14. Here, however, block 1530 further comprises determining a location of the RIS based at least in part on an AoA measurement at the receiving device, multilateration, or both. As indicated in the embodiments above, a receiving device having an antenna array may be capable of making an AoA measurement. This is true not only of a receiving device comprising a TRP, but also a receiving device comprising a UE. That said, because a TRP may have a larger antenna array, it may be capable of a more accurate AoA measurement. As indicated in earlier embodiments, multilateration may be performed using multiple receiving devices (e.g., multiple UEs, multiple TRPs, or some combination thereof) and/or a single device and multiple locations.

FIG. 16 illustrates an embodiment of a UE 105, which can be utilized as described herein above (e.g., in association with FIGS. 1-15). For example, the UE 105 can perform one or more of the functions of the method shown in FIGS. 13-15. It should be noted that FIG. 16 is meant only to provide a generalized illustration of various components, any or all of which may be utilized as appropriate. It can be noted that, in some instances, components illustrated by FIG. 16 can be localized to a single physical device and/or distributed among various networked devices, which may be disposed at different physical locations (e.g., on different locations of a vehicle or person's body). Furthermore, as previously noted, the functionality of the UE discussed in the previously described embodiments may be executed by one or more of the hardware and/or software components illustrated in FIG. 16.

The UE 105 is shown comprising hardware elements that can be electrically coupled via a bus 1605 (or may otherwise be in communication, as appropriate). The hardware elements may include a processing unit(s) 1610 which can include without limitation one or more general-purpose processors, one or more special-purpose processors (such as DSP chips, graphics acceleration processors, application specific integrated circuits (ASICs), and/or the like), and/or other processing structures or means. As shown in FIG. 16, some embodiments may have a separate DSP 1620, depending on desired functionality. Location determination and/or other determinations based on wireless communication may be provided in the processing unit(s) 1610 and/or wireless communication interface 1630 (discussed below). The UE 105 also can include one or more input devices 1670, which can include without limitation one or more keyboards, touch screens, touch pads, microphones, buttons, dials, switches, and/or the like; and one or more output devices 1615, which can include without limitation one or more displays (e.g., touch screens), light emitting diodes (LEDs), speakers, and/or the like.

The UE 105 may also include a wireless communication interface 1630, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 105 to communicate with other devices as described in the embodiments above. The wireless communication interface 1630 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1632 that send and/or receive wireless signals 1634. According to some embodiments, the wireless communication antenna(s) 1632 may comprise a plurality of discrete antennas, antenna arrays, or any combination thereof. The antenna(s) 1632 may be capable of transmitting and receiving wireless signals using beams (e.g., Tx beams and Rx beams). Beam formation may be performed using digital and/or analog beam formation techniques, with respective digital and/or analog circuitry. The wireless communication interface 1630 may include such circuitry.

Depending on desired functionality, the wireless communication interface 1630 may comprise a separate receiver and transmitter, or any combination of transceivers, transmitters, and/or receivers to communicate with TRPs (e.g., ng-eNBs and gNBs) and other terrestrial transceivers, such as wireless devices and access points. The UE 105 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000@, WCDMA, and so on. CDMA2000@ includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000@ is described in documents from a consortium named "3rd Generation Partnership Project X3" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 1640. Sensor(s) 1640 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 105 may also include a Global Navigation Satellite System (GNSS) receiver 1680 capable of receiving signals 1684 from one or more GNSS satellites using an antenna 1682 (which could be the same as antenna 1632). Positioning based on GNSS signal measurement can be utilized to complement and/or incorporate the techniques described herein. The GNSS receiver 1680 can extract a position of the UE 105, using conventional techniques, from GNSS satellites 110 of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1680 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1680 is illustrated in FIG. 16 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 1610, DSP 1620, and/or a processing unit within the wireless communication interface 1630 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processing units, such as processing unit(s) 1610 or DSP 1620.

The UE 105 may further include and/or be in communication with a memory 1660. The memory 1660 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1660 of the UE 105 also can comprise software elements (not shown in FIG. 16), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1660 that are executable by the UE 105 (and/or processing unit(s) 1610 or DSP 1620 within UE 105). In some embodiments, then, such code and/or instructions can be used to configure and/or adapt a general-purpose computer (or other device) to perform one or more operations in accordance with the described methods.

FIG. 17 illustrates an embodiment of a TRP 320, which can be utilized as described herein above (e.g., in association with FIGS. 1-16). It should be noted that FIG. 17 is meant only to provide a generalized illustration of various components, any or all of which may be utilized as appropriate. In some embodiments, the TRP 320 may correspond to a gNB, an ng-eNB, and/or (more generally) a base station.

The TRP 320 is shown comprising hardware elements that can be electrically coupled via a bus 1705 (or may otherwise be in communication, as appropriate). The hardware elements may include a processing unit(s) 1710 which can include without limitation one or more general-purpose processors, one or more special-purpose processors (such as DSP chips, graphics acceleration processors, ASICs, and/or the like), and/or other processing structure or means. As shown in FIG. 17, some embodiments may have a separate DSP 1720, depending on desired functionality. Location determination and/or other determinations based on wireless communication may be provided in the processing unit(s) 1710 and/or wireless communication interface 1730 (discussed below), according to some embodiments. The TRP 320 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The TRP 320 might also include a wireless communication interface 1730, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the TRP 320 to communicate as described herein. The wireless communication interface 1730 may permit data and signaling to be communicated (e.g., transmitted and received) to UEs, other base stations/TRPs (e.g., eNBs, gNBs, and ng-eNBs), and/or other network components, computer systems, and/or any other electronic devices described herein. The communication can be carried out via one or more wireless communication antenna(s) 1732 that send and/or receive wireless signals 1734.

The TRP 320 may also include a network interface 1780, which can include support of wireline communication technologies. The network interface 1780 may include a modem, network card, chipset, and/or the like. The network interface 1780 may include one or more input and/or output communication interfaces to permit data to be exchanged with a network, communication network servers, computer systems, and/or any other electronic devices described herein.

In many embodiments, the TRP 320 may further comprise a memory 1760. The memory 1760 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1760 of the TRP 320 also may comprise software elements (not shown in FIG. 17), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1760 that are executable by the TRP 320 (and/or processing unit(s) 1710 or DSP 1720 within TRP 320). In some embodiments, then, such code and/or instructions can be used to configure and/or adapt a general-purpose computer (or other device) to perform one or more operations in accordance with the described methods.

FIG. 18 is a block diagram of an embodiment of a computer system 1800, which may be used, in whole or in part, to provide the functions of one or more network components as described in the embodiments herein (e.g., location server 160 of FIGS. 1 and 10). It should be noted that FIG. 18 is meant only to provide a generalized illustration of various components, any or all of which may be utilized as appropriate. FIG. 18, therefore, broadly illustrates how individual system elements may be implemented in a relatively separated or relatively more integrated manner. In addition, it can be noted that components illustrated by FIG. 18 can be localized to a single device and/or distributed among various networked devices, which may be disposed at different geographical locations.

The computer system 1800 is shown comprising hardware elements that can be electrically coupled via a bus 1805 (or may otherwise be in communication, as appropriate). The hardware elements may include processing unit(s) 1810, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1800 also may comprise one or more input devices 1815, which may comprise without limitation a mouse, a keyboard, a camera, a microphone, and/or the like; and one or more output devices 1820, which may comprise without limitation a display device, a printer, and/or the like.

The computer system 1800 may further include (and/or be in communication with) one or more non-transitory storage devices 1825, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1800 may also include a communications subsystem 1830, which may comprise wireless communication technologies managed and controlled by a wireless communication interface 1833, as well as wired technologies (such as Ethernet, coaxial communications, universal serial bus (USB), and the like). The wireless communication interface 1833 may comprise one or more wireless transceivers may send and receive wireless signals 1855 (e.g., signals according to 5G NR or LTE) via wireless antenna(s) 1850. Thus the communications subsystem 1830 may comprise a modem, a network card (wireless or wired), an infrared communication device, a wireless communication device, and/or a chipset, and/or the like, which may enable the computer system 1800 to communicate on any or all of the communication networks described herein to any device on the respective network, including a User Equipment (UE), TRPs and/or other TRPs, and/or any other electronic devices described herein. Hence, the communications subsystem 1830 may be used to receive and send data as described in the embodiments herein.

In many embodiments, the computer system 1800 will further comprise a working memory 1835, which may comprise a RAM or ROM device, as described above. Software elements, shown as being located within the working memory 1835, may comprise an operating system 1840, device drivers, executable libraries, and/or other code, such as one or more applications 1845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1825 described above. In some cases, the storage medium might be incorporated within a computer system, such as computer system 1800. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1800 and/or might take the form of source and/or installable code, which, upon compilation and/or installation on the computer system 1800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of channel estimation for positioning using an Reconfigurable Intelligent Surface (RIS), the method comprising: obtaining first and second measurement information made by a receiving device of a respective first plurality of received wireless signals and second plurality of received wireless signals, wherein each of the first plurality of received wireless signals and second plurality of received wireless signals comprises: a respective RIS-reflected signal that travels a first path from a transmitting device to the receiving device by reflecting off the RIS, and at least one other wireless signal that travels a second path; wherein: the RIS implements a first weight to reflect the RIS-reflected signal of the first plurality of received wireless signals, and the RIS implements a second weight to reflect the RIS-reflected signal of the second plurality of received wireless signals; and determining a wireless channel corresponding to each of the first path and the second path based at least in part on the first and second measurement information, the first weight, and the second weight.

Clause 2. The method of clause 1, wherein the determining is performed by the receiving device.

Clause 3. The method of any of clauses 1-2 wherein the receiving device comprises a User Equipment (UE) or a Transmission Reception Point (TRP).

Clause 4. The method of any of clauses 1 and 3 wherein the determining is performed by a separate device from the receiving device, wherein obtaining the first and second measurement information comprises receiving the first and second measurement information from the receiving device with the separate device.

Clause 5. The method of any of clauses 1 and 3-4 wherein the receiving device comprises a UE and the separate device comprises a serving TRP of the receiving device.

Clause 6. The method of any of clauses 1 and 3-5 wherein the separate device comprises the transmitting device.

Clause 7. The method of any of clauses 1-6 further comprising configuring the RIS to implement the first weight to reflect the RIS-reflected signal of the first plurality of received wireless signals and implement the second weight to reflect the RIS-reflected signal of the second plurality of received wireless signals.

Clause 8. The method of any of clauses 1-7 wherein configuring the RIS comprises indicating, to the RIS, a pattern by which the RIS is to implement the first weight and the second weight.

Clause 9. The method of any of clauses 1-8 further comprising indicating, to the receiving device, the pattern by which the RIS is to implement the first weight and the second weight.

Clause 10. The method of any of clauses 1-9 wherein the first weight is different from the second weight in amplitude, phase, or both.

Clause 11. The method of any of clauses 1-10 wherein the first plurality of received wireless signals corresponds to a first transmitted Positioning Reference Signal (PRS) having a first identifier (ID) and the second plurality of received wireless signals corresponds to a second transmitted PRS having a second ID.

Clause 12. The method of any of clauses 1-11 further comprising obtaining third measurement information made by the receiving device of a respective third plurality of received wireless signals comprising: a respective RIS-reflected signal that travels a third path from the transmitting device to the receiving device by reflecting off a second RIS, and at least one other wireless signal that travels the second path; wherein the RIS implements a third weight to reflect the RIS-reflected signal of the third plurality of received wireless signals; and determining a wireless channel corresponding to the third path based at least in part on the third measurement information and the third weight.

Clause 13. The method of any of clauses 1-12 wherein the second path comprises a direct path from the transmitting device to the receiving device, and wherein the method further comprises, for the first plurality of received wireless signals, the second plurality of received wireless signals, or both: using the determined wireless channel to identify the respective RIS-reflected signal; determining a length of the first path based on a timing different between receiving the respective RIS-reflected signal and the respective at least one other wireless signal that travels the direct path; and determining a location of the RIS based at least in part on the determined a length of the first path, a location of the transmitting device, and a location of the receiving device.

Clause 14. The method of clause 13 further comprising determining an angle at the receiving device of the first path, wherein determining the location of the RIS is further based at least in part on the angle.

Clause 15. A network-connected device for channel estimation for positioning using an Reconfigurable Intelligent Surface (RIS), the network-connected device comprising: a transceiver; a memory; and one or more processors communicatively coupled with the transceiver and the memory, wherein the one or more processors are configured to: obtain first and second measurement information made by a receiving device of a respective first plurality of received wireless signals and second plurality of received wireless signals, wherein each of the first plurality of received wireless signals and second plurality of received wireless signals comprises: a respective RIS-reflected signal that travels a first path from a transmitting device to the receiving device by reflecting off the RIS, and at least one other wireless signal that travels a second path; wherein: the RIS implements a first weight to reflect the RIS-reflected signal of the first plurality of received wireless signals, and the RIS implements a second weight to reflect the RIS-reflected signal of the second plurality of received wireless signals; and determine a wireless channel corresponding to each of the first path and the second path based at least in part on the first and second measurement information, the first weight, and the second weight.

Clause 16. The network-connected device of clause 15, wherein the network-connected device comprises the receiving device.

Clause 17. The network-connected device of clause 15 wherein the network-connected device comprises a separate device from the receiving device, wherein, to obtain the first and second measurement information, the one or more processors are configured to receive the first and second measurement information from the receiving device via the transceiver.

Clause 18. The network-connected device of any of clauses 15 and 17 wherein the network-connected device comprises a serving TRP of the receiving device.

Clause 19. The network-connected device of any of clauses 15 and 17-18 wherein the network-connected device comprises the transmitting device.

Clause 20. The network-connected device of any of clauses 15-19 wherein the one or more processors are further configured to configure the RIS to implement the first weight to reflect the RIS-reflected signal of the first plurality of received wireless signals and implement the second weight to reflect the RIS-reflected signal of the second plurality of received wireless signals.

Clause 21. The network-connected device of any of clauses 15-20 wherein, the one or more processors are configured to, when configuring the RIS, indicate to the RIS a pattern by which the RIS is to implement the first weight and the second weight.

Clause 22. The network-connected device of any of clauses 15-21 wherein the one or more processors are further configured to indicate, to the receiving device, the pattern by which the RIS is to implement the first weight and the second weight.

Clause 23. The network-connected device of any of clauses 15-22 wherein the one or more processors are further configured to: obtain third measurement information made by the receiving device of a respective third plurality of received wireless signals comprising: a respective RIS-reflected signal that travels a third path from the transmitting device to the receiving device by reflecting off a second RIS, and at least one other wireless signal that travels the second path; wherein the RIS implements a third weight to reflect the RIS-reflected signal of the third plurality of received wireless signals; and determine a wireless channel corresponding to the third path based at least in part on the third measurement information and the third weight.

Clause 24. The network-connected device of any of clauses 15-23 wherein the second path comprises a direct path from the transmitting device to the receiving device, and wherein the one or more processors are further configured to, for the first plurality of received wireless signals, the second plurality of received wireless signals, or both: use the determined wireless channel to identify the respective RIS-reflected signal; determine a length of the first path based on a timing different between receiving the respective RIS-reflected signal and the respective at least one other wireless signal that travels the direct path; and determine a location of the RIS based at least in part on the determined a length of the first path, a location of the transmitting device, and a location of the receiving device.

Clause 25. The network-connected device of any of clauses 15-24 wherein the one or more processors are further configured to determine an angle at the receiving device of the first path, wherein determining the location of the RIS is further based at least in part on the angle.

Clause 26. An apparatus for channel estimation for positioning using an Reconfigurable Intelligent Surface (RIS), the apparatus comprising: means for obtaining first and second measurement information made by a receiving device of a respective first plurality of received wireless signals and second plurality of received wireless signals, wherein each of the first plurality of received wireless signals and second plurality of received wireless signals comprises: a respective RIS-reflected signal that travels a first path from a transmitting device to the receiving device by reflecting off the RIS, and at least one other wireless signal that travels a second path; wherein: the RIS implements a first weight to reflect the RIS-reflected signal of the first plurality of received wireless signals, and the RIS implements a second weight to reflect the RIS-reflected signal of the second plurality of received wireless signals; and determining a wireless channel corresponding to each of the first path and the second path based at least in part on the first and second measurement information, the first weight, and the second weight.

Clause 27. The apparatus of clause 26, wherein the apparatus comprises the receiving device.

Clause 28. The apparatus of clause 26 wherein the apparatus comprises a separate device from the receiving device, and wherein the means for obtaining the first and second measurement information comprise means for receiving the first and second measurement information from the receiving device with the separate device.

Clause 29. The apparatus of clause 26-28 wherein the apparatus comprises the transmitting device.

Clause 30. A non-transitory computer-readable medium storing instructions for channel estimation for positioning using an Reconfigurable Intelligent Surface (RIS), the instructions comprising code for: obtaining first and second measurement information made by a receiving device of a respective first plurality of received wireless signals and second plurality of received wireless signals, wherein each of the first plurality of received wireless signals and second plurality of received wireless signals comprises: a respective RIS-reflected signal that travels a first path from a transmitting device to the receiving device by reflecting off the RIS, and at least one other wireless signal that travels a second path; wherein: the RIS implements a first weight to reflect the RIS-reflected signal of the first plurality of received wireless signals, and the RIS implements a second weight to reflect the RIS-reflected signal of the second plurality of received wireless signals; and determining a wireless channel corresponding to each of the first path and the second path based at least in part on the first and second measurement information, the first weight, and the second weight.

What is claimed is:

1. A method of channel estimation for positioning using a Reconfigurable Intelligent Surface (RIS), the method comprising:

obtaining first and second measurement information made by a receiving device of a respective first plurality of received wireless signals and second plurality of received wireless signals, wherein each of the first plurality of received wireless signals and second plurality of received wireless signals comprises:

a respective RIS-reflected signal that travels a first path from a transmitting device to the receiving device by reflecting off the RIS, and at least one other wireless signal that travels a second path comprising a direct path from the transmitting device to the receiving device;

wherein:

the RIS implements a first weight to reflect the RIS-reflected signal of the first plurality of received wireless signals, and the RIS implements a second weight to reflect the RIS-reflected signal of the second plurality of received wireless signals;

determining a wireless channel corresponding to each of the first path and the second path based at least in part on the first and second measurement information, the first weight, and the second weight; and for the first plurality of received wireless signals, the second plurality of received wireless signals, or both:

using the determined wireless channel to identify the respective RIS-reflected signal;

determining a length of the first path based on a timing difference between receiving the respective RIS-reflected signal and the respective at least one other wireless signal that travels the direct path; and determining a location of the RIS based at least in part on the determined length of the first path, a location of the transmitting device, and a location of the receiving device.

2. The method of claim 1, wherein determining the wireless channel is performed by the receiving device.

3. The method of claim 1, wherein the receiving device comprises a User Equipment (UE) or a Transmission Reception Point (TRP).

4. The method of claim 1, wherein determining the wireless channel is performed by a separate device from the receiving device, wherein obtaining the first and second measurement information comprises receiving the first and second measurement information from the receiving device with the separate device.

5. The method of claim 4, wherein the receiving device comprises a UE and the separate device comprises a serving TRP of the receiving device.

6. The method of claim 4, wherein the separate device comprises the transmitting device.

7. The method of claim 1, further comprising configuring the RIS to implement the first weight to reflect the RIS-reflected signal of the first plurality of received wireless signals and implement the second weight to reflect the RIS-reflected signal of the second plurality of received wireless signals.

8. The method of claim 7, wherein configuring the RIS comprises indicating, to the RIS, a pattern by which the RIS is to implement the first weight and the second weight.

9. The method of claim 8, further comprising indicating, to the receiving device, the pattern by which the RIS is to implement the first weight and the second weight.

10. The method of claim 1, wherein the first weight is different from the second weight in amplitude, phase, or both.

11. The method of claim 1, wherein the first plurality of received wireless signals corresponds to a first transmitted Positioning Reference Signal (PRS) having a first identifier (ID) and the second plurality of received wireless signals corresponds to a second transmitted PRS having a second ID.

12. The method of claim 1, further comprising obtaining third measurement information made by the receiving device of a respective third plurality of received wireless signals comprising:

a respective RIS-reflected signal that travels a third path from the transmitting device to the receiving device by reflecting off a second RIS, and at least one other wireless signal that travels the second path;

wherein the second RIS implements a third weight to reflect the RIS-reflected signal of the third plurality of received wireless signals; and determining a wireless channel corresponding to the third path based at least in part on the third measurement information and the third weight.

13. The method of claim 1, further comprising determining an angle at the receiving device of the first path, wherein determining the location of the RIS is further based at least in part on the angle.

14. A network-connected device for channel estimation for positioning using a Reconfigurable Intelligent Surface (RIS), the network-connected device comprising:

a transceiver;

a memory; and one or more processors communicatively coupled with the transceiver and the memory, wherein the one or more processors are configured to:

obtain first and second measurement information made by a receiving device of a respective first plurality of received wireless signals and second plurality of received wireless signals, wherein each of the first plurality of received wireless signals and second plurality of received wireless signals comprises:

a respective RIS-reflected signal that travels a first path from a transmitting device to the receiving device by reflecting off the RIS, and at least one other wireless signal that travels a second path comprising a direct path from the transmitting device to the receiving device;

wherein:

the RIS implements a first weight to reflect the RIS-reflected signal of the first plurality of received wireless signals, the RIS implements a second weight to reflect the RIS-reflected signal of the second plurality of received wireless signals; and determine a wireless channel corresponding to each of the first path and the second path based at least in part on the first and second measurement information, the first weight, and the second weight; and for the first plurality of received wireless signals, the second plurality of received wireless signals, or both;

use the determined wireless channel to identify the respective RIS-reflected signal;

determine a length of the first path based on a timing difference between receiving the respective RIS-reflected signal and the respective at least one other wireless signal that travels the direct path; and determine a location of the RIS based at least in part on the determined length of the first path, a location of the transmitting device, and a location of the receiving device.

15. The network-connected device of claim 14, wherein the network-connected device comprises the receiving device.

16. The network-connected device of claim 14, wherein the network-connected device comprises a separate device from the receiving device, wherein, to obtain the first and second measurement information, the one or more processors are configured to receive the first and second measurement information from the receiving device via the transceiver.

17. The network-connected device of claim 16, wherein the network-connected device comprises a serving TRP of the receiving device.

18. The network-connected device of claim 16, wherein the network-connected device comprises the transmitting device.

19. The network-connected device of claim 14, wherein the one or more processors are further configured to configure the RIS to implement the first weight to reflect the RIS-reflected signal of the first plurality of received wireless signals and implement the second weight to reflect the RIS-reflected signal of the second plurality of received wireless signals.

20. The network-connected device of claim 19, wherein, the one or more processors are configured to, when configuring the RIS, indicate to the RIS a pattern by which the RIS is to implement the first weight and the second weight.

21. The network-connected device of claim 20, wherein the one or more processors are further configured to indicate, to the receiving device, the pattern by which the RIS is to implement the first weight and the second weight.

22. The network-connected device of claim 14, wherein the one or more processors are further configured to:
- obtain third measurement information made by the receiving device of a respective third plurality of received wireless signals comprising:
  - a respective RIS-reflected signal that travels a third path from the transmitting device to the receiving device by reflecting off a second RIS, and
  - at least one other wireless signal that travels the second path;
  - wherein the second RIS implements a third weight to reflect the RIS-reflected signal of the third plurality of received wireless signals; and
- determine a wireless channel corresponding to the third path based at least in part on the third measurement information and the third weight.

23. The network-connected device of claim 14, wherein the one or more processors are further configured to determine an angle at the receiving device of the first path, wherein determining the location of the RIS is further based at least in part on the angle.

24. An apparatus for channel estimation for positioning using a Reconfigurable Intelligent Surface (RIS), the apparatus comprising:
- means for obtaining first and second measurement information made by a receiving device of a respective first plurality of received wireless signals and second plurality of received wireless signals, wherein each of the first plurality of received wireless signals and second plurality of received wireless signals comprises:
  - a respective RIS-reflected signal that travels a first path from a transmitting device to the receiving device by reflecting off the RIS, and
  - at least one other wireless signal that travels a second path comprising a direct path from the transmitting device to the receiving device;
  - wherein:
    - the RIS implements a first weight to reflect the RIS-reflected signal of the first plurality of received wireless signals, and
    - the RIS implements a second weight to reflect the RIS-reflected signal of the second plurality of received wireless signals; and
- means for determining a wireless channel corresponding to each of the first path and the second path based at least in part on the first and second measurement information, the first weight, and the second weight; and
- for the first plurality of received wireless signals, the second plurality of received wireless signals, or both;
  - means for using the determined wireless channel to identify the respective RIS-reflected signal;
  - means for determining a length of the first path based on a timing difference between receiving the respective RIS-reflected signal and the respective at least one other wireless signal that travels the direct path; and
  - means for determining a location of the RIS based at least in part on the determined length of the first path, a location of the transmitting device, and a location of the receiving device.

25. The apparatus of claim 24, wherein the apparatus comprises the receiving device.

26. The apparatus of claim 24, wherein the apparatus comprises a separate device from the receiving device, and wherein the means for obtaining the first and second measurement information comprise means for receiving the first and second measurement information from the receiving device with the separate device.

27. The apparatus of claim 26, wherein the apparatus comprises the transmitting device.

28. A non-transitory computer-readable medium storing instructions for channel estimation for positioning using a Reconfigurable Intelligent Surface (RIS), the instructions comprising code for:
- obtaining first and second measurement information made by a receiving device of a respective first plurality of received wireless signals and second plurality of received wireless signals, wherein each of the first plurality of received wireless signals and second plurality of received wireless signals comprises:
  - a respective RIS-reflected signal that travels a first path from a transmitting device to the receiving device by reflecting off the RIS, and
  - at least one other wireless signal that travels a second path comprising a direct path from the transmitting device to the receiving device;
  - wherein:
    - the RIS implements a first weight to reflect the RIS-reflected signal of the first plurality of received wireless signals, and
    - the RIS implements a second weight to reflect the RIS-reflected signal of the second plurality of received wireless signals; and
- determining a wireless channel corresponding to each of the first path and the second path based at least in part on the first and second measurement information, the first weight, and the second weight; and
- for the first plurality of received wireless signals, the second plurality of received wireless signals, or both:
  - using the determined wireless channel to identify the respective RIS-reflected signal;
  - determining a length of the first path based on a timing difference between receiving the respective RIS-reflected signal and the respective at least one other wireless signal that travels the direct path; and
  - determining a location of the RIS based at least in part on the determined length of the first path, a location of the transmitting device, and a location of the receiving device.

* * * * *